United States Patent
Toyoshima et al.

(10) Patent No.: US 6,622,787 B1
(45) Date of Patent: Sep. 23, 2003

(54) AIR CONDITIONER FOR A VEHICLE

(75) Inventors: Takashi Toyoshima, Kariya (JP); Kazushi Shikata, Kariya (JP); Yukio Ueno, Toyokawa (JP); Nobuyuki Doi, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/312,777

(22) Filed: May 17, 1999

(30) Foreign Application Priority Data

May 18, 1998 (JP) .......................................... 10-135361
Dec. 25, 1998 (JP) .......................................... 10-370324
Feb. 18, 1999 (JP) .......................................... 11-040289

(51) Int. Cl.⁷ ............................. B60H 1/00; F25B 29/00
(52) U.S. Cl. ..................... 165/203; 165/204; 165/42; 165/43; 454/156; 454/160; 454/161; 454/121; 237/12.3 A; 237/12.3 B
(58) Field of Search .................. 165/42, 43, 203, 165/204; 454/156, 160, 161, 121; 237/12.3 A, 12.3 B

(56) References Cited

U.S. PATENT DOCUMENTS

| | | | |
|---|---|---|---|
| 4,791,981 A | | 12/1988 | Ito |
| 4,994,958 A | * | 2/1991 | Iida ............................. 165/43 |
| 5,626,186 A | * | 5/1997 | Honda et al. ................. 165/43 |
| 5,934,989 A | * | 8/1999 | Yamamoto ................... 454/156 |
| 6,019,288 A | * | 2/2000 | Arold et al. .................. 165/43 |
| 6,079,484 A | * | 6/2000 | Uemura et al. ............. 165/204 |

FOREIGN PATENT DOCUMENTS

| | | | | |
|---|---|---|---|---|
| EP | 0289405 | * | 4/1988 | |
| JP | 0043017 | * | 4/1981 | ............... 4454/156 |
| JP | 58-136813 | * | 9/1983 | |
| JP | 60-4410 | * | 1/1985 | ................... 165/43 |
| JP | 0010922 | * | 1/1991 | ..................... 237/5 |
| JP | A-5-278448 | | 10/1993 | |
| WO | WO 96/29211 | * | 9/1996 | |

* cited by examiner

Primary Examiner—John K. Ford
(74) Attorney, Agent, or Firm—Harness, Dickey & Pierce, PLC

(57) ABSTRACT

A defroster/face cool air passage for introducing cooled air from an evaporator to a defroster opening portion and a face opening portion by bypassing a heater core, and a foot cool air passage for introducing cooled air from the evaporator to a foot opening portion by bypassing a heater core, are formed independently from each other. The foot cool air passage is located at sides of the heater core in a vehicle right-and-left direction. The cooled air from the foot cool air passage is mixed with warmed air having passed through the heater core at an inlet of the foot opening portion. Accordingly, pressure loss at a foot mode in an air conditioning unit with a central installation layout is reduced, and a mounting performance on a central portion of a vehicle instrument panel is improved.

16 Claims, 21 Drawing Sheets

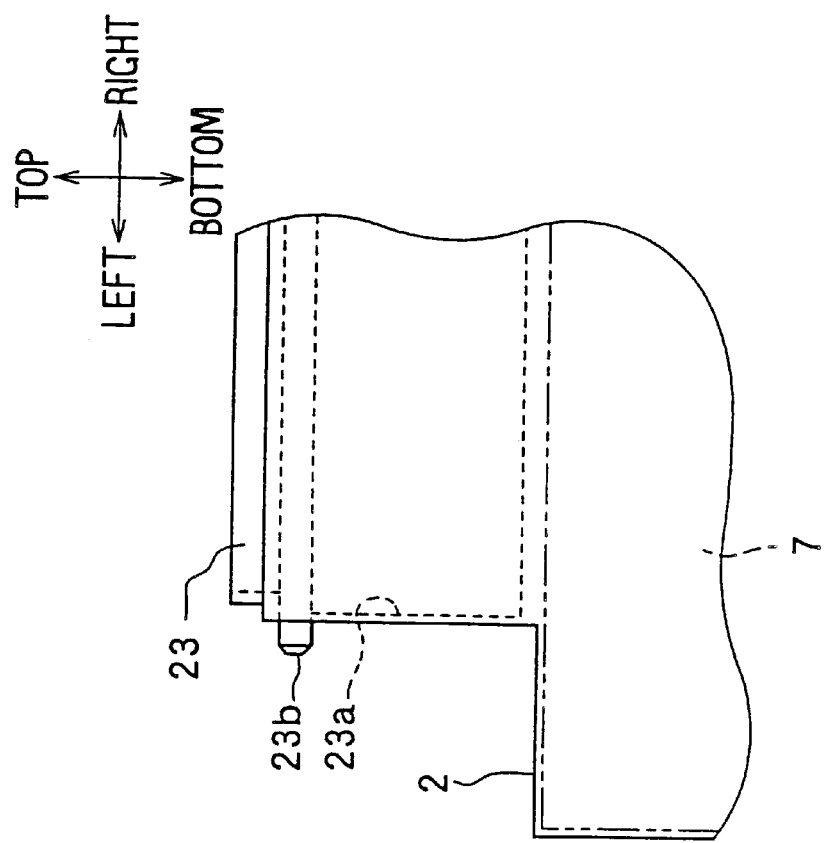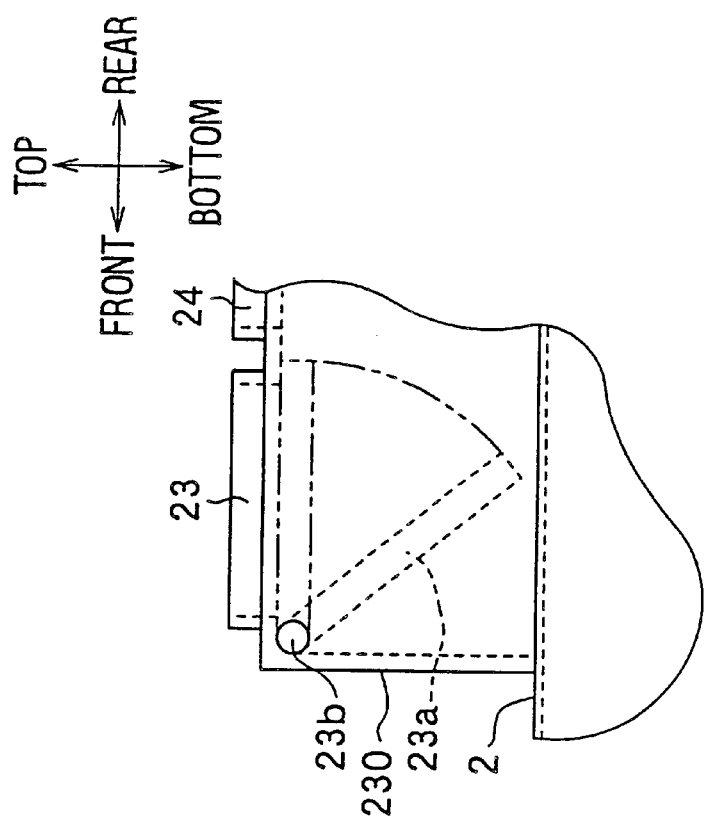

AIR CONDITIONER FOR A VEHICLE

CROSS REFERENCE TO RELATED APPLICATIONS

This application is based upon and claims priority from Japanese patent application Nos. Hei 10-135361, filed on May 18, 1998, and Hei 10-370324, filed on Dec. 25, 1998, and Hei 11-40289, filed on Feb. 18, 1999.

BACKGROUND OF THE INVENTION

1. Field of the Invention

The present invention relates to an air conditioner for a vehicle in which the mounting performance of the air conditioner in an instrument panel at the front in a passenger compartment is improved.

2. Description of Prior Art

Conventionally, in an air conditioner for a vehicle, when an air conditioning unit is arranged in the vicinity of an instrument panel at the front in a passenger compartment, such a semicentral installation layout is put to practical use that the air conditioning unit incorporating an evaporator for cooling, a heater core for heating, a blow mode changing mechanism, and the like is arranged at substantially the central portion of the instrument panel in a vehicle right-and-left direction, and an air blower for sending air to the air conditioning unit is offset arranged at a side of the air conditioning unit and at a passenger seat side.

Besides, a complete central installation layout in which an air blower is arranged at the vehicle front side of the air conditioning unit is also partially put to practical use.

In both of the conventional semicentral installation layout and the complete central installation layout in a mounted state on a vehicle, generally, a cool air passage bypassing a heater core (heat exchanger for heating) is arranged over the heater core, and in both a face mode and a foot mode, a common cool air passage and a common air mixing chamber are used to adjust blow air temperature by adjusting the mixture of cooled air and warmed air.

In order to increase the amount of cooled air at the maximum cooling mode, the shape of the cool air passage and the air mixing chamber of the air conditioning unit is generally designed to give priority to reducing the pressure loss in the face mode. Thus, in many cases, an air passage for the foot mode has a bent shape, so that the pressure loss is increased during the foot mode.

SUMMARY OF THE INVENTION

The present invention is made in light of the foregoing problem, and it is an object of the present invention to provide an air conditioner for a vehicle in which both the reduction of pressure loss in the foot mode and the improvement of a mounting performance on a vehicle are achieved.

According to a first aspect of the present invention, an air conditioner has a face cool air passage and a foot cool air passage formed separately from the face cool air passage. The face cool air passage is formed to bypass a heating heat exchanger and to introduce cooled air to a face opening portion. The foot cool air passage is formed to bypass the heating heat exchanger and to introduce cooled air to a foot opening portion.

The foot cool air passage is located at a side of the heating heat exchanger in a vehicle right-and-left direction. Cooled air from the foot cool air passage and warmed air heated by the heating heat exchanger are mixed at an inlet of the foot opening portion.

According to the first aspect of the present invention, the temperature of air blown from the face opening portion and the foot opening portion is excellently controlled by adjusting the ratio of amounts of cooled air and warmed air.

Further, since the foot cool air passage is independently formed from the face cool air passage, and cooled air and warmed air are mixed at the inlet side of the foot opening portion, the warm air passage at a downstream side of the heating heat exchanger is formed to have a shape that the passage has few bends and reaches the inlet side of the foot opening portion in a short distance without being restricted by the shape of the face cool air passage. Accordingly, pressure loss at the foot mode is reduced, and the amount of air at the foot mode is increased.

Further, not only the face cool air passage and the foot cool air passage are formed independently, but the foot cool air passage is also arranged at the side of the heating heat exchanger in the vehicle right-and-left direction. Therefore, the foot cool air passage can be arranged at positions shifted from the face cool air passage in the vehicle right-and-left direction. Thus, the increase of the size of the entire case of the air conditioning unit in a vehicle top-and-bottom direction is prevented.

Furthermore, since the warm air passage at the downstream side of the heating heat exchanger can be directly guided to the inlet side of the foot opening portion without being bent in the vehicle top-and-bottom direction, the size in a vehicle front-and-rear direction is also reduced. Accordingly, the mounting performance of the air conditioning unit on the central portion of the vehicle is improved.

According to a second aspect of the present invention, the face cool air passage is located over an upper portion of the heating heat exchanger, and the foot cool air passage is bent downwardly after it passes through an upper side of the side of the heating heat exchanger.

Accordingly, since both the face cool air passage and the foot cool air passage are positioned at the upper side of the heating heat exchanger in the vehicle top-and-bottom direction, the amount of cooled air passing through the face cool air passage and the foot cool air passage can be adjusted by a common temperature adjusting means, so that the structure is simplified.

According to a third aspect of the present invention, the foot opening portions are arranged at both sides of the case in the vehicle right-and-left direction, and the foot cool air passages are arranged at both sides of the heating heat exchanger in the vehicle right-and-left direction correspondingly to the respective foot opening portions.

Accordingly, cooled air is directly introduced to the inlet side of the foot opening portions at both the sides in the right-and-left direction through the foot cool air passages at both the left and right sides with a small bent angle.

According to a fourth aspect of the present invention, a width of the heating heat exchanger in the vehicle right-and-left direction is less than a width of the cooling heat exchanger in the vehicle right-and-left direction, and the foot cool air passage is arranged at the side of the heating heat exchanger in the vehicle right-and-left direction and within a range of the width of the cooling heat exchanger in the vehicle right-and-left direction.

Accordingly, the foot cool air passage is arranged while surplus spaces produced at the sides of the heating heat exchanger in the vehicle right-and-left direction are effectively used, so that the size of the entire case of the air conditioning unit is effectively decreased.

Furthermore, the width of the cooling heat exchanger in the vehicle right-and-left direction is greater than the width of the heating heat exchanger. Therefore, the size of the cooling heat exchanger in the top-and-bottom direction is reduced, and the size of the entire case of the air conditioning unit in the top-and-bottom direction is reduced.

Further, by the enlargement of the width size of the cooling heat exchanger in the vehicle right-and-left direction, cooled air is widely blown toward the upper half of the passenger at the face mode (at the time of cooling) by effectively using the oblong shape of the cooling heat exchanger. Thus, a feeling of cooling is improved by increasing a sense of cooled air flow to the passenger, and at the same time, bends of cooled air are reduced, and the reduction of pressure loss at the face mode is achieved.

According to a fifth aspect of the present invention, the width $W_0$ of the heating heat exchanger in the vehicle right-and-left direction is set to satisfy the following relation with respect to the width W of the cooling heat exchanger in the vehicle right-and-left direction:

$$(0.6 \times W) \leq W_0 \leq (0.8 \times W)$$

Accordingly, when the foot cool air passage is arranged at the side of the heating heat exchanger in the vehicle right-and-left direction and within the range of the width W of the cooling heat exchanger in the vehicle right-and-left direction, by making $W_0$ not higher than 0.8×W, the width of the foot cool air passage is sufficiently secured and the amount of cooled air necessary for control of foot blow temperature is secured, so that the controllability of the foot blow temperature is improved. Moreover, by making $W_0$ not lower than 0.6×W, a required heat transfer area of the heating heat exchanger is secured and necessary heating capacity of the heating heat exchanger is secured.

According to a sixth aspect of the present invention, the air conditioner has a defroster opening portion for blowing the air with a temperature adjusted by the temperature adjusting means toward a windshield, and the cooling heat exchanger has a width in the vehicle right-and-left direction comparable to the width of the case, and each of a width of the defroster opening portion and a width of the face opening portion in the vehicle right-and-left direction is smaller than the width of the cooling heat exchanger in the vehicle right-and-left direction.

Accordingly, the cooled air having passed the cooling heat exchanger is prevented from excessively flowing to the defroster opening portion and the face opening portion. As a result, the amount of flow of cooled air after the cooling heat exchanger through the foot cool air passage to the foot opening portion is increased, so that the excessive increase in temperature of foot blow air is prevented, and the temperature difference of upper and lower blow is suitably controlled, and the feeling of air conditioning is improved.

According to a seventh aspect of the present invention, the defroster opening portion is located at a vehicle front side relative to the face opening portion, and a defroster door for opening and closing the defroster opening portion is rotatably provided in the case, and the width of the defroster opening portion is smaller than the width of the cooling heat exchanger at a most vehicle front side of a rotary position of the defroster door.

Accordingly, the excessive inflow of cooled air to the defroster opening portion and the face opening portion is excellently suppressed while the rotating space of the defroster door is secured.

According to an eighth aspect of the present invention, the defroster opening portion and the face opening portion are arranged at a central portion of the case in the vehicle right-and-left direction, so that protruding amounts of the cooling heat exchanger to both of the defroster opening portion and the face opening portion in the vehicle right-and-left direction become comparable, and the blow-out temperature in the vehicle right-and-left direction is made uniform.

According to a ninth aspect of the present invention, the air conditioner includes a first foot door for controlling warmed air flow from the heating heat exchanger and a second foot door for controlling cooled air flow from the foot cool air passage. Further, the first foot door and the second foot door are linked together to control the air flow to the foot opening portion.

Accordingly, when the foot cool air passage is arranged at the side of the heating heat exchanger in the vehicle right-and-left direction, the cooled air flow and the warmed air flow are controlled by both of the first and the second foot doors to mix the cooled air and the warmed air at the downstream side of the doors.

According to a tenth aspect of the present invention, the first foot door is positioned at an upstream side of the inlet of the foot opening portion, so that the first foot door can be arranged outside of the warm air passage immediately after the heating heat exchanger, and airflow resistance of the warm air passage is reduced.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

FIG. 11A is a partial side view of the vicinity of a defroster opening portion according to the second embodiment;

FIG. 11B is a partial front view of the vicinity of a defroster opening portion according to the second embodiment;

DETAILED DESCRIPTION OF PREFERRED EMBODIMENTS

Preferred embodiments of the present invention will be described below with reference to the drawings.

First Embodiment

Figure 1:
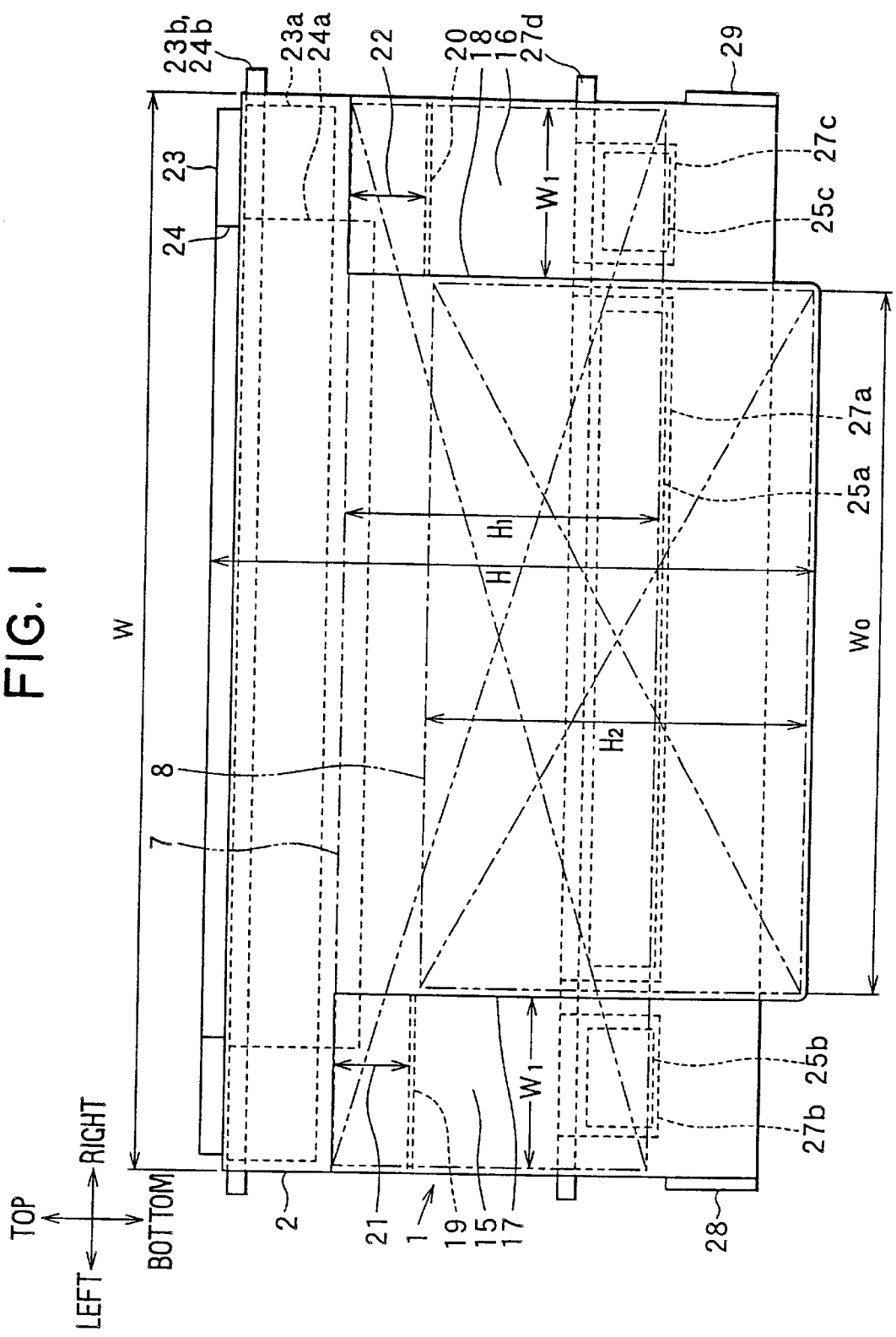
FIG. 1 is a schematic front view of an air conditioning unit according to a first embodiment of the present invention.
Figure 2:
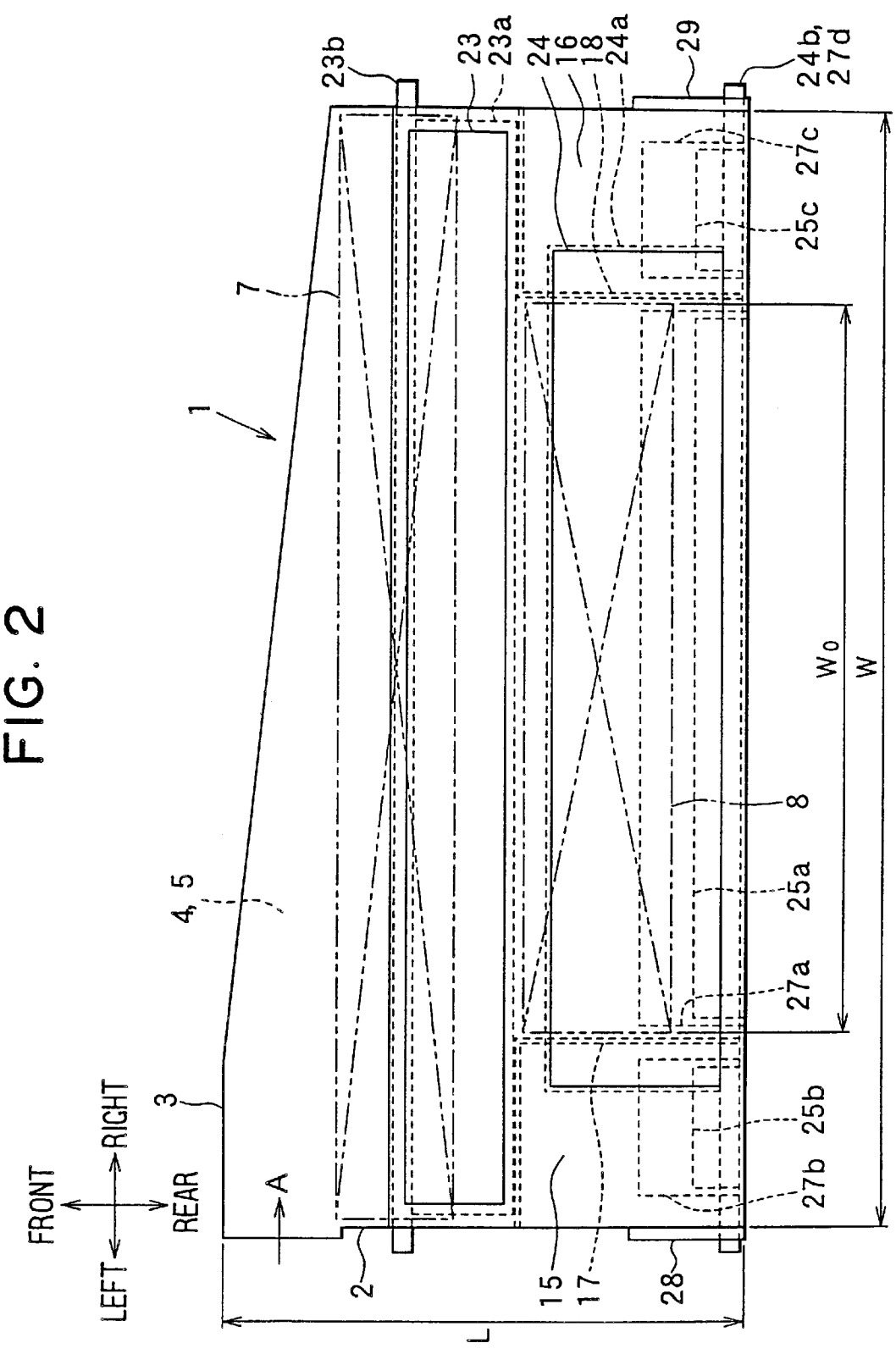
FIG. 2 is a schematic top view of the air conditioning unit according to the first embodiment.

FIG. 1 is a front view of an air conditioning unit 1 of the first embodiment, and FIG. 2 is a plan view thereof. The air conditioning unit 1 of this embodiment is of a so-called semicentral installation layout, and is arranged in an instrument panel of a front in a passenger compartment and at substantially its central portion in a vehicle right-and-left direction. An air blower unit (not shown) for sending air to the air conditioning unit 1 is offset arranged at the side of the air conditioning unit and at the passenger seat side. The air conditioning unit 1 is arranged as shown in the drawings with respect to the front and rear direction, right and left direction, and up and down direction of a vehicle, and is mounted on the vehicle.

Next, the mounting of this air conditioning unit 1 on the vehicle will now be described in detail. As shown in FIGS. 1 and 2, the air conditioning unit 1 is designed to have such a flat and oblong shape that the size H in the vehicle top-and bottom (up-and-down) direction is small as compared with the size W in the vehicle right-and-left direction and the size L in the vehicle front-and-rear direction. For example, the size W is 460 mm, the size L in the vehicle front-and-rear direction is 230 mm, and the size H in the vehicle top-and-bottom direction is 250 mm in the first embodiment.

Next, the specific structure of the air conditioning unit 1 formed into the flat oblong shape as set forth above will now be described in detail.

The air conditioning unit 1 includes an air conditioning case 2 made of plastic, and this air conditioning case 2 is formed by coupling a plurality of division cases into one body so that the flat oblong shape is obtained. Air passages in which blown air passes through a heat exchanger and flows from the vehicle front side to the vehicle rear side, are formed in the inside of the case. Furthermore, various instruments described later are housed in this air conditioning case 2.

As shown in FIG. 2, an air inlet portion 3 into which blown air from a not-shown air blower unit is blown, is formed in the front end portion of the air conditioning unit 1 at the vehicle front side. In the case of a car having a driver's seat at the right side, the air blower-unit is located at the left side of the air conditioning unit 1. Accordingly, the air inlet portion 3 is positioned at the left side end of the air conditioning unit 1, and air is blown from the vehicle left side as shown by an arrow A.

As shown in the sectional views of FIGS. 3 to 9 described later, a first air passage 4 positioned at the vehicle top side and a second air passage 5 positioned at the vehicle bottom side are formed in the air inlet portion 3. The first and second air passages 4 and 5 are partitioned by a partition plate 6. The partition plate 6 can be integrally formed with the air conditioning case 2.

The air blower unit has a well known structure, and has an inner and outer air changing mechanism for changing the introduction of outer air (air outside a passenger compartment) from an outer air inlet port and inner air (air inside the passenger compartment) from an inner air inlet port. The air blower unit further includes an air blower for sending intake air from the outer air intake port and the inner air intake port. This air blower includes a first fan for the outer air and a second fan for the inner air, and in an inner and outer air double layer flow mode, the outer air and the inner air can be blown separately at the same time by the first fan and the second fan.

Incidentally, the inner and outer air double layer flow mode is such a mode that at maximum heating in a blow mode in which air is blown from both a foot opening portion and a defroster opening portion to be described later, warmed outer air with low humidity is blown from the defroster opening portion to prevent a windshield from being fogged, and at the same time, re-circulated high temperature inner air is blown from the foot opening portion to improve the heating performance around a passenger foot portion.

In the inner and outer air double layer flow mode, the outer air from the first fan is blown into the first air passage 4 of the air inlet portion 3 at the vehicle top side, and the inner air from the second fan is blown into the second air passage 5 at the vehicle down side.

On the other hand, in the inside of the flat oblong air conditioning case 2, there are formed a first air passage 9 (a passage of air flow indicated by arrow B in FIG. 3, etc.) in which air (outer air) flows from the first air passage 4 in the air inlet portion 3 at the vehicle front side through heat exchangers 7 and 8 to the vehicle rear side, and a second air passage 10 (a passage of air flow indicated by arrow C in FIG. 3, etc.) in which air (inner air) flows from the second air passage 5 in the air inlet portion 3 through the heat exchangers 7 and 8 to the vehicle rear side. In the air conditioning case 2, an evaporator 7 is substantially vertically arranged at a portion just after the air inlet portion 3 so as to cross the entire region of the air passages 9 and 10.

In the first embodiment, the evaporator 7 is made to have an oblong shape (see FIGS. 1 and 2) with substantially the same size (W) as the case 2 in the vehicle right-and-left direction. Incidentally, in FIG. 1, $H_1$ is the size of the evaporator 7 in the vehicle top-and-bottom direction. The evaporator 7 is a conventional heat exchanger for cooling the air by absorbing evaporation latent heat of the refrigerant for a refrigeration cycle from the air to be conditioned. Furthermore, the evaporator 7 is, for example, a well-known stacked type, in which flat tubes, each being formed by bonding two metal thin plates of aluminum or the like, are stacked through corrugated fins and are integrally brazed.

Figure 3:
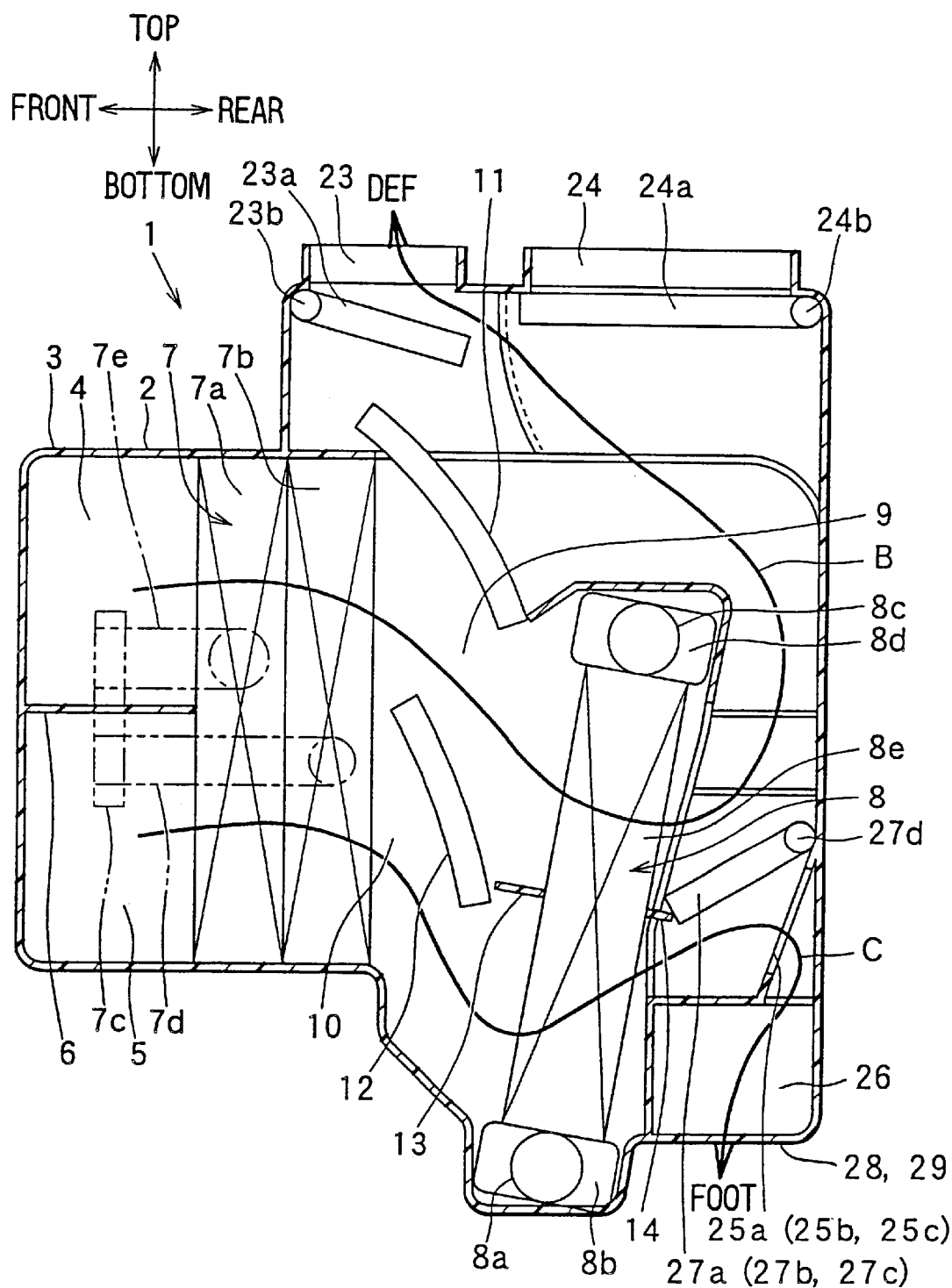
FIG. 3 is a longitudinal sectional view of the air conditioning unit with the maximum heating state in the foot blow mode according to the first embodiment.

The evaporator 7 of the first embodiment is, as shown in FIG. 3, etc., formed such that a heat exchange portion 7a at an upstream side of the air flow and a heat exchange portion 7b at a downstream side of the air flow are combined. After the refrigerant flows into the downstream side heat exchange portion 7b from an inlet pipe 7d of a piping joint 7c, it passes through the upstream side heat exchange portion 7a, and thereafter, the refrigerant flows out to an outlet pipe 7e.

At the immediately downstream side (vehicle rear side) of the evaporator 7, two air mix doors (temperature adjusting means) 11 and 12 are adjacently arranged in such a manner that they are capable of sliding substantially in the vehicle top-and-bottom direction. Each of the air mix doors 11 and 12 is made of an arc-shaped plate having a large radius of curvature which is close to a flat plate, and is made to have an oblong shape with substantially the same size as the size W of the air conditioning case 2 in the vehicle right-and-left direction.

A link mechanism (not shown) is coupled to either one of side ends, in the vehicle right-and-left direction, of each of the arc-shaped plates constituting the air mix doors 11 and 12. The air mix doors 11 and 12 are slid by this link mechanism in the vehicle top-and-bottom direction between the maximum heating position shown in FIG. 3 and the maximum cooling position shown in FIG. 7.

An actuator (servomotor) is coupled to this link mechanism, and the air mix doors 11 and 12 are driven by this actuator through the link mechanism. At the maximum heating position, as shown in FIG. 3, the lower air mix door 12 corresponds to a partition member for partitioning the first air passage 9 and the second air passage 10.

At the immediately downstream side (vehicle rear side) of the air mix doors 11 and 12, a heater core 8 is offset arranged at the lower side of the evaporator 7 substantially in the vertical direction. The width $W_0$ of the heater core 8 in the vehicle right-and-left direction is smaller than the size W of the evaporator 7 in the vehicle right-and-left direction. In the example of FIGS. 1 and 2, the size $W_0$ is made about 70% of the size W. Incidentally, in FIG. 1, $H_2$ denotes the size of the heater core 8 in the vehicle top-and-bottom direction.

The heater core 8 reheats the cooled air having passed through the evaporator 7, and is structured such that high temperature hot water (engine cooling water) flows therein, and air is heated by this hot water as a heat source. Similarly to the evaporator 7, the heater core 8 has also such an oblong shape that the size $W_0$ in the vehicle right-and-left direction is the longest.

In the heater core 8, an inlet tank 8b having an inlet pipe 8a of hot water is arranged at the lower side, an outlet tank 8d having an outlet pipe 8c of hot water is arranged at the upper side, and a heat exchange portion 8e is formed between the inlet tank 8b and the outlet tank 8d. This heat exchange portion 8e is constructed in such a manner that a number of flat tubes, each being made of a metal thin plate which is made of aluminum or the like and has a flat sectional shape, are stacked via corrugated fins and are integrally brazed. In the first embodiment, it is designed such that hot water flows from the inlet tank 8b toward the outlet tank 8d in one direction (one direction from the lower side to the upper side) through all of the flat tubes of the heat exchange portion Be.

At an intermediate portion of the heat exchange portion 8e of the heater core 8 in the top-and-bottom direction, partition plates 13 and 14 for partitioning the first and second air passages 9 and 10 are provided at the air upstream side and downstream side, respectively. The partition plates 13 and 14 can be integrally formed with the air conditioning case 2.

Next, the structure of passages of warmed air and cooled air, the ratio of air amounts of which is adjusted by the air mix doors 11 and 12, will be described.

Figure 4:
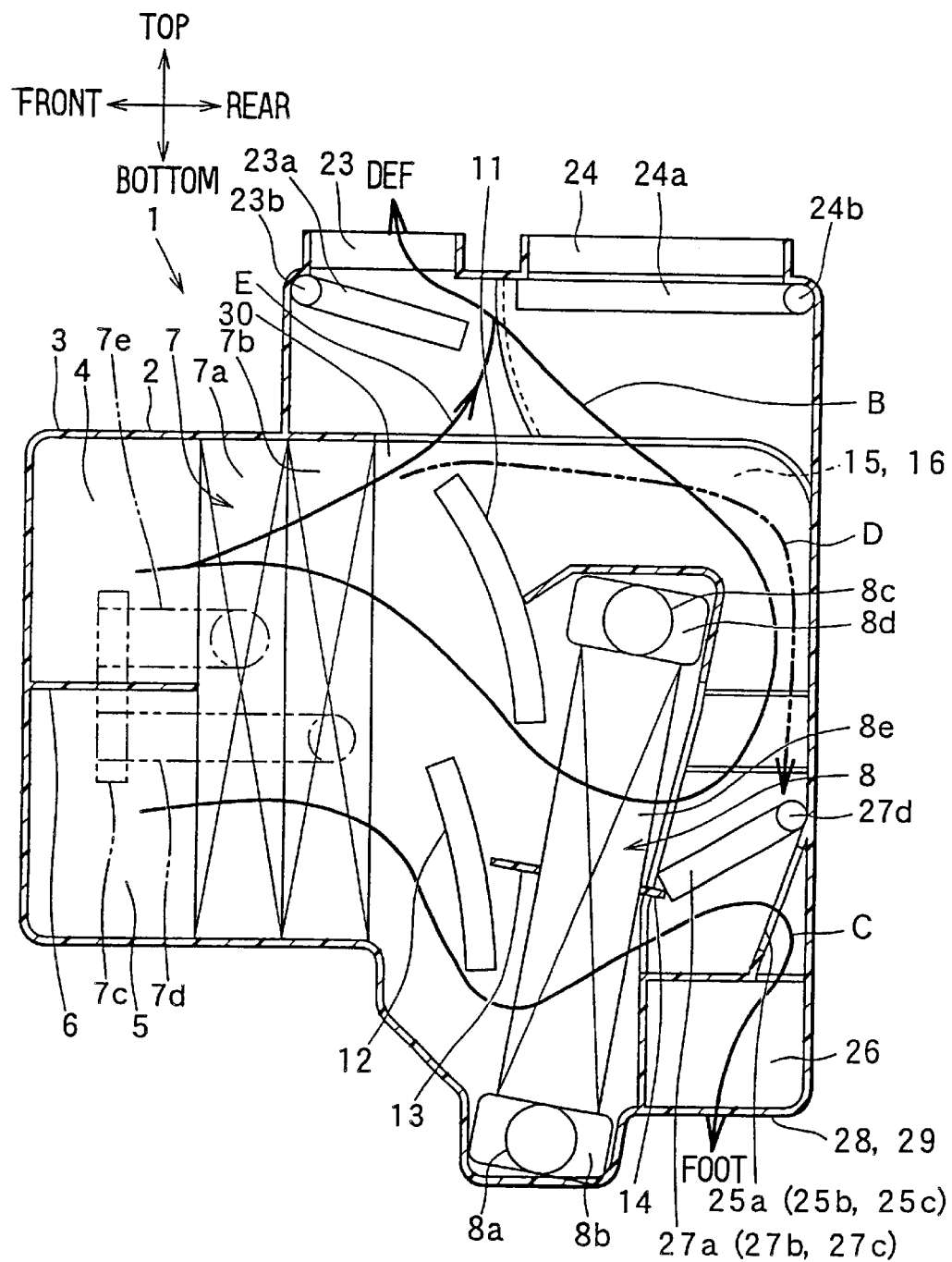
FIG. 4 is a longitudinal sectional view of the air conditioning unit with the temperature control state in the foot mode according to the first embodiment.

FIG. 4 shows the temperature control region of a foot blow mode, that is, the state in which temperature control is made by mixture of warmed air and cooled air. In the range of the size $W_0$ of the heater core 8 in the vehicle right-and-left direction, warm air passages (see arrows B and C in FIG. 4) passing through the heater core 8 are formed.

On the other hand, foot cool air passages 15 and 16 (see FIGS. 1 and 2) for allowing cooled air immediately after the evaporator 7 to bypass the heater core 8 and for guiding the cooled air to a foot opening portion side are formed at both side portions of the size $W_0$ of the heater core 8 in the vehicle right-and-left direction. Partition plates 17 and 18 are disposed at both the sides of the heater core 8 in the vehicle right-and-left direction, and the foot cool air passages 15 and 16 are partitioned by the partition plates 17 and 18 from the warm air passages (arrows B and C in FIG. 4) passing through the heater core 8 in the air conditioning case 2 in the vehicle right-and-left direction.

Further, partition plates 19 and 20 (see FIG. 1) standing from the bottom of the air conditioning case 2 to substantially the top of the heater core 8 are provided between the partition plates 17, 18 and both side walls of the air conditioning case 2 in the vehicle right-and-left direction. By providing the partition plates 19 and 20, cooled air intakes 21 and 22 (see FIG. 1) for introducing cooled air immediately after the evaporator 7 into the foot cool air passages 15 and 16 are formed at both of the sides of the evaporator 7 in the vehicle right-and-left direction and at only the upper portion.

The size of the cooled air intakes 21 and 22 in the top-and-bottom direction is indicated by respective arrows in FIG. 1. The partition plates 19 and 20 are formed in a portion at the vehicle rear side relative to the air mix doors 11 and 12 not to interfere with sliding of the air mix doors 11 and 12.

In FIG. 4, a two-dot-chain line D indicates the cooled air flow through the cool air passages 15 and 16. As shown by this two-dot-chain line D, the foot cool air passages 15 and 16 are designed such that cooled air immediately after the evaporator 7 is introduced from the cooled air intakes 21 and 22, passes through the upper side of the heater core 8, and is guided to the lower side of the heater core 8.

Next, the blow mode changing mechanism in the first embodiment will now be described.

A plurality of blow-out openings are formed at the downstream side of the air passage of the air conditioning case 2. Among the blow-out openings, a defroster opening portion 23 has an opening, as shown in FIGS. 2 and 3, in such a manner that it communicates with the inside of the air conditioning case 2 at the upper portion of the air conditioning case 2 and at substantially the central portion in the vehicle front-and-rear direction. A defroster duct (not shown) is connected to the defroster opening portion 23, and air is blown from a defroster opening portion (blow-out port) provided at the tip of the defroster duct toward the inner surface of the windshield. The defroster opening portion 23 is closed and opened by a defroster door 23a. The defroster door 23a is a plate-shaped door rotatable around a rotary shaft 23b.

A face opening portion 24 is for blowing air toward the head of a passenger in a passenger compartment, and has an opening at the upper portion of the air conditioning case 2 and at the region of the vehicle rear side relative to the defroster opening portion 23. A face duct (not shown) is connected to the face opening portion 24, and air is blown from a face opening portion (blow port) provided at the tip of the face duct to the head of the passenger in the passenger compartment. The face opening portion 24 is closed and opened by a face door 24a. This face door 24a is a plate-shaped door rotatable around a rotary shaft 24b.

Foot opening portions 25a, 25b, and 25c are ventilation ports for letting warmed air and cooled air for the foot to pass through, and have openings at the bottom side of the air conditioning case 2 and at the vehicle rearmost side portion. Specifically, as shown in FIGS. 1 and 2, the foot opening portion 25a is located at the central portion of the air conditioning case 2 in the vehicle right-and-left direction. Warmed air from the warm air passages (arrows B and C in FIG. 4) passing through the heater core 8 passes through the foot opening portion 25a at the central portion and is flown into a lower air mixing chamber 26 (FIG. 3, etc.).

Foot opening portions 25b and 25c corresponding to the foot cool air passages 15 and 16 are arranged at both side portions of the air conditioning case 2 in the vehicle right-and-left direction. Cooled air from the foot cool air passages 15 and 16 passes through the foot opening portions 25b and 25c and flows into the lower air mixing chamber 26.

The foot opening portions 25a, 25b, and 25c are opened and closed by a first foot door 27a and second foot doors 27b and 27c, respectively. Each of the foot doors (opening and closing means) 27a, 27b, and 27c is a plate-shaped door, and is connected to a rotary shaft 27d. Thus, the three foot doors 27a, 27b, and 27c are rotatable with the rotary shaft 27d.

The central foot door (first foot door) 27a is, as shown in FIG. 3, operated to the opened position at the foot mode, and the tip end of the foot door 27a comes in contact with the partition plate 14, so that the first foot door 27a serves, at the downstream side of the heater core 8, also as a partition member for partitioning the air passage into the first air passage 9 for the outer air and the second air passage 10 for the inner air.

The rotary shaft 23b of the defroster door 23a, the rotary shaft 24b of the face door 24a, and the rotary shaft 27d of the foot doors 27a, 27b, and 27c are connected to an actuator (single or plural servo motors) via a link mechanism (not shown), and the respective doors 23.a, 24a, 27a, 27b, and 27c are driven by the actuator(s) via the link mechanism.

Since the air mixing chamber 26 (FIG. 3, etc.) forms one communicated space in the vehicle right-and-left direction, the warmed air from the central foot opening portion 25a and cooled air from the foot opening portions 25b and 25c at both the side portions are mixed with each other in the air mixing chamber 26.

Foot opening portions 28 and 29 having respective openings toward the foot side of the passenger in the passenger compartment are provided at both the sides of the air mixing chamber 26 in the vehicle right-and-left direction. Accordingly, the air mixing chamber 26 serves to form a warm air passage for directly guiding the warmed air having passed through the heater core 8 via the central foot door 27a to the inlet side of the foot opening portions 28 and 29. The foot opening portions 28 and 29 serve as a foot blow-out port for blowing air to the foot side of the passenger in the passenger compartment.

Figure 7:
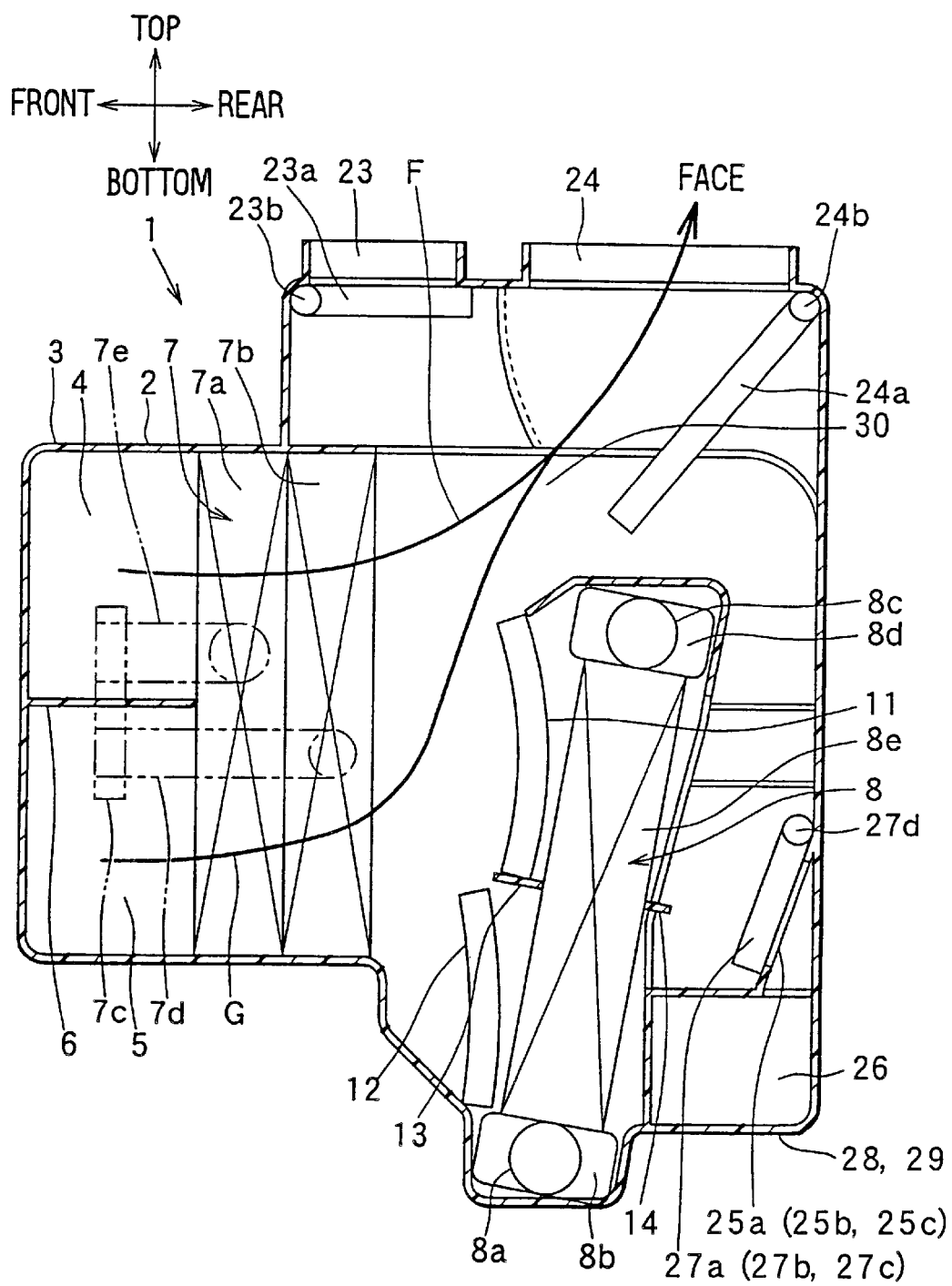
FIG. 7 is a longitudinal sectional view of the air conditioning unit with the maximum cooling state in the face blow mode according to the first embodiment.

On the other hand, a defroster/face cool air passage 30, for flowing cooled air from the portion immediately after the evaporator 7 to the upper defroster opening portion 23 and the face opening portion 24 as shown by an arrow E in FIG. 4 and arrows F and G in FIG. 7, is formed independently from the aforementioned foot cool air passages 15 and 16. Since both the defroster/face cool air passage 30 and the foot cool air passages 15 and 16 are positioned above the heater core 8, both the opening degree of the defroster/face cool air passage 30 and respective opening degrees of the cooled air intakes 21 and 22 of the foot cool air passages 15 and 16 are adjusted by the displacement of the upper air mix door 11. The opening degree of the warm air passages (arrows B and C in FIG. 4) passing through the heater core 8 is adjusted by the displacement of the air mix doors 11 and 12.

Operations for each blow mode in the first embodiment will now be described.

[Foot Blow Mode]

FIG. 3 shows the maximum heating state in the foot blow mode. The face opening portion 24 is fully closed by the face door 24a. The defroster opening portion 23 is opened in a small opening degree by the defroster door 23a. On the other hand, all of the three foot opening portions 25a, 25b and 25c are fully opened by the foot doors 27a, 27b, and 27c. In the maximum heating state, the two air mix doors 11 and 12 are operated to the uppermost position shown in FIG. 3, and the defroster/face cool air passage 30 and the foot cool air passages 15 and 16 are fully closed by the upper air mix door 11.

On the other hand, the heat exchange portion 8e at the upper and lower portions of the heater core 8 is fully opened through the portion between the two air mix doors 11 and 12 and the lower space of the lower air mix door 12. In this case, the lower air mix door 12 and the first foot door 27a serve as partition members for partitioning the first air passage 9 for the outer air and the second air passage 10 for the inner air as described before.

Furthermore, in the maximum heating state of the foot blow mode, the inner and outer air double layer flow mode of the air blower unit which introduces both the inner air and the outer air is selected by the inner and outer air changing mechanism. Thus, by the operation of first and second fans of the air blower unit, the outer air is introduced into the first air passage 4 of the air inlet portion 3, and the inner air is introduced into the second air passage 5 of the air inlet portion 3.

After the outer air in the first air passage 4 passes through the evaporator 7, it passes through the first air passage 9 between the two air mix doors 11 and 12, and flows into the upper side of the heat exchange portion 8e of the heater core 8, where the air is heated by hot water and becomes the warmed air. After the inner air in the second air passage 5 passes through the evaporator 7, it flows into the lower side of the heat exchange portion 8e of the heater core 8 through the second air passage 10 at the lower side of the lower air mix door 12, where the air is heated by hot water and becomes warmed air.

The downstream side passage of the heater core 8 is divided into the first air passage 9 and the second air passage 10 by the partition plate 14 and the first foot door 27a. Accordingly, the flow direction of the warmed outer air is changed to the upside as shown by the arrow B, and is directed to the defroster opening portion 23. The warmed outer air is blown toward the inner surface of the windshield from the not-shown opening portion (blow-out port) of the tip of the defroster duct, and prevents the windshield from being fogged.

On the other hand, as shown by arrow C, the warmed inner air passes through the foot opening portion 25a at the central portion, and the flow direction is changed to the lower side. Further, the warmed inner air passes through the air mixing chamber 26, and is blown to the passenger foot portions at the driver seat side and the passenger seat side via the two foot opening portions (blow-out ports) 28 and 29 to heat the passenger foot portion.

In the maximum heating state, as shown by the arrow C, the warmed inner air changes its flow direction to the lower side at the portion immediately after the lower side of the heat exchange portion 8e of the heater core 8, and directly flows to the inlet side of the foot opening portions (blow-out ports) 28 and 29 via the air mixing chamber 26, so that pressure loss of the passage for the warmed inner air is reduced, and the blow amount of the warmed inner air is increased.

Accordingly, both of the improvement in the heating performance at the passenger foot portion and securing of the antifog performance for the windshield are achieved.

FIG. 4 shows the temperature control state in the foot blow mode, which is different from FIG. 3 in that the two air mix doors 11 and 12 are displaced from the maximum heating position of the uppermost portion to the intermediate position lower than the maximum heating position.

By the displacement of the air mix doors 11 and 12, both the defroster/face cool air passage 30 and the foot cool air passages 15 and 16 are opened in a predetermined opening degree, and the opening degree of the warm air passages (arrows B and C in FIG. 4) passing through the heater core 8 is reduced from the fully opened state to a predetermined opening degree.

As a result, the warmed air having passed through the lower side of the heat exchange portion 8e of the heater core 8 passes through the foot opening portion 25a at the central portion as shown by arrow C, and flows into the air mixing chamber 26. At the same time, among the cooled air immediately after the evaporator 7, cooled air positioned at both the right and left ends of the evaporator 7 and at the upper portion flows into the foot cool air passages 15 and 16 from the cooled air intakes 21 and 22.

As shown by arrow D in FIG. 4, this cooled air passes through the upper side of the heater core 8 at the side portions of the right and left ends of the heater core 8, and then, the cooled air flows toward the lower side. Then the cooled air passes through the foot opening portions 25b and 25c at the right and left sides, which are in the opened state by the second foot doors 27b and 27c, and flows into the air mixing chamber 26.

Accordingly, after the warmed air from the central foot opening portion 25a is mixed with the cooled air from the side foot opening portions 25b and 25c in the air mixing chamber 26 to become warmed air having a predetermined temperature, the mixed warmed air is blown to the passenger foot portion at the driver seat side and the passenger seat side from the foot opening portions (blow-out ports) 28 and 29 at both the right and left portions of the air conditioning case 2.

The warmed air having passed through the upper side of the heat exchange portion 8e of the heater core 8 flows to the defroster opening portion 23 as shown by arrow B, and part of the cooled air immediately after the evaporator 7 passes through the defroster/face cool air passage 30 as shown by arrow E and flows to the defroster opening portion 23.

Accordingly, after the warmed air and the cooled air are mixed at the inlet side of the defroster opening portion 23 to form warmed air with a predetermined temperature, the warmed air passes through the defroster duct from the defroster opening portion 23 and is blown toward the inner surface of the windshield from the opening portion (blow-out port) of the duct tip portion so that the windshield is prevented from being fogged.

The temperature of the blown warmed air to the passenger foot portion and the windshield can be arbitrarily adjusted by adjusting the operation position of the air mix doors 11 and 12.

In the temperature control state of the foot blow mode, the shapes of the foot cool air passages 15 and 16 as shown by arrow D in FIG. 4 and the warm air passage (arrow C in FIG. 4) passing through the heater core 8 are such that after air flows substantially linearly in the vehicle front-and-rear direction, they are bent downward and are directed toward the inlet side of the foot opening portions 28 and 29. Thus, since the warm air passages have a simple shape with few bends, the pressure loss is reduced, and the amount of blown warmed air to the passenger foot portion is increased.

In the temperature control state of the foot blow mode, the ventilation function in the passenger compartment and antifog performance of the windshield are given priority over the heating capacity, and for an intake mode of inner and outer air, a full outer air mode (that is, a mode in which outer air is introduced into both the first air passages 4, 9 and the second air passages 5 and 10) is generally selected.

[Foot Defroster Blow Mode]

Figure 5:
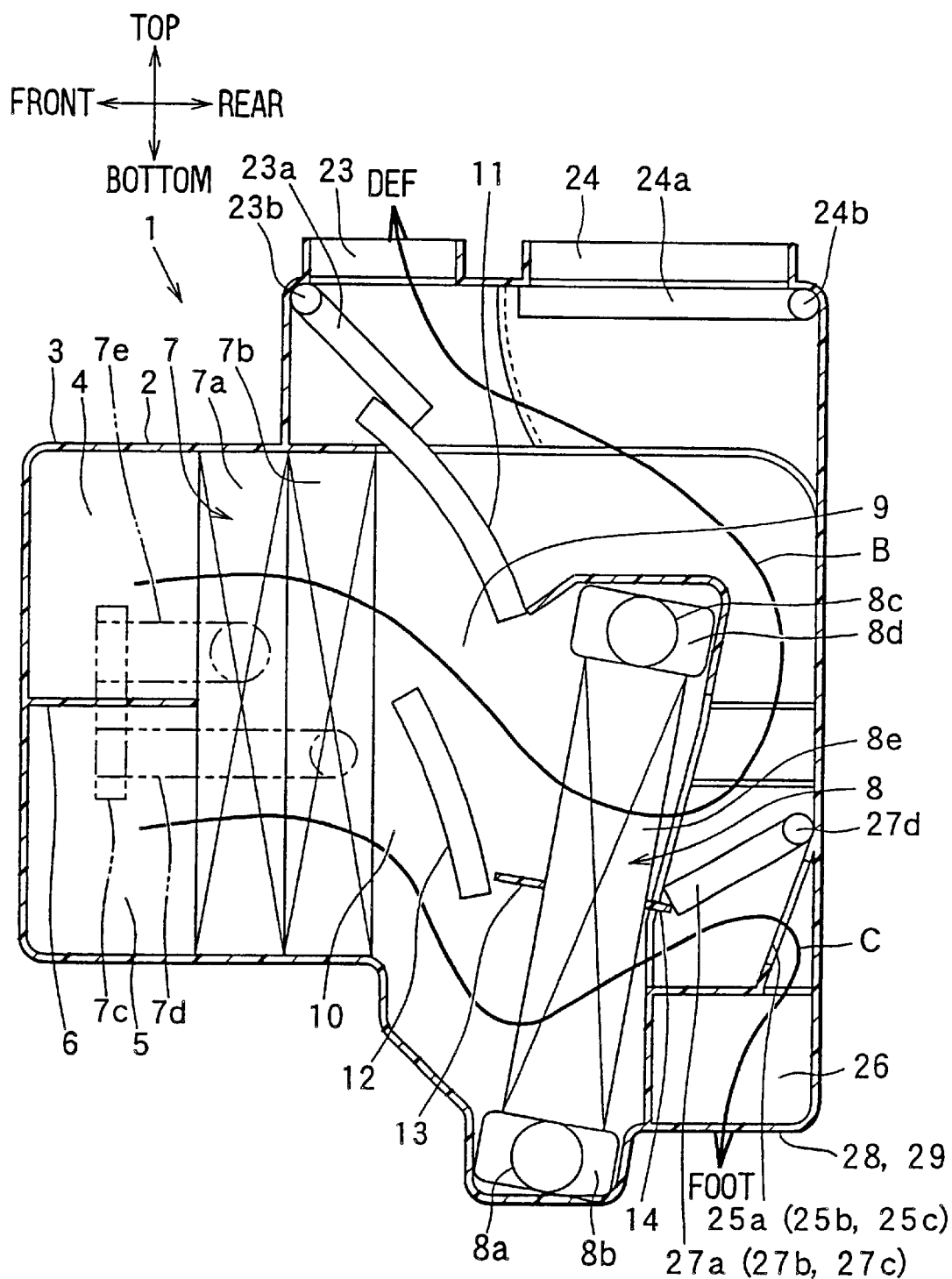
FIG. 5 is a longitudinal sectional view of the air conditioning unit with the maximum heating state in the foot defroster blow mode according to the first embodiment.

FIG. 5 shows the maximum heating state of a foot defroster blow mode. Compared with the maximum heating state of the foot blow mode shown in FIG. 3, it is different that the defroster door 23a is located at a fully opened position of the defroster opening portion 23. Accordingly, the amount of blown air from the defroster opening portion 23 is increased.

In the foot blow mode, in general, the ratio of the amount of blown air at the foot side to the amount of blown air at the defroster side is about 8 to 2. On the other hand, in the foot defroster blow mode, since the defroster opening portion 23 is fully opened, the ratio of the amount of blown air at the foot side to the amount of blown air at the defroster side becomes about 5 to 5. Other features in this mode is the same as the foot blow mode, and the explanation thereof will be obviated.

[Defroster Blow Mode]

Figure 6:
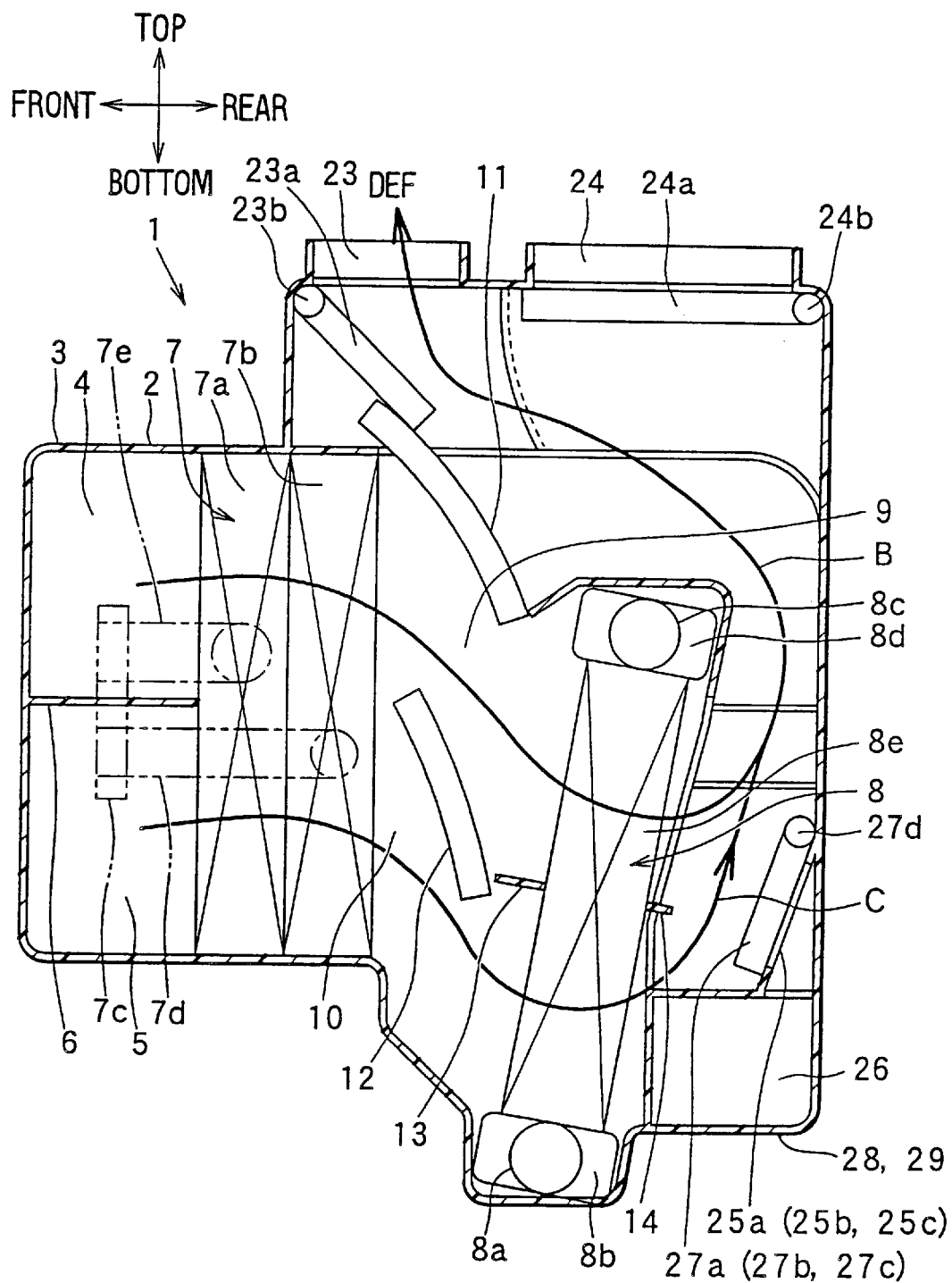
FIG. 6 is a longitudinal sectional view of the air conditioning unit with the maximum heating state in the defroster blow mode according to the first embodiment.

FIG. 6 shows the maximum heating state of a defroster blow mode.

The face opening portion 24 is fully closed by the face door 24a, and three foot opening portions 25a, 25b and 25c are fully closed by the respective foot doors 27a, 27b and 27c. On the other hand, the defroster opening portion 23 is fully opened by the defroster door 23a.

Thus, warmed air having passed through both the upper and lower sides of the heat exchange portion 8e of the heater core 8 flows toward the defroster opening portion 23 as shown by arrows B and C. In other words, the whole amount of the warmed air passes through the defroster duct from the defroster opening portion 23 and is blown toward the inner surface of the windshield from the opening portion (blow-out port) at the tip portion of the duct to prevent the windshield from being fogged.

Although a temperature control state of the defroster blow mode in the first embodiment is not shown in Figures, similarly to the temperature control state of the foot blow mode and the foot defroster blow mode, the ratio of the blow amount of cooled air from the defroster/face cool air passage 30 to the blow amount of warmed air passing through the heater core 8 is adjusted by adjusting the operational position of the air mix doors 11 and 12, so that the temperature of the warmed air blown to the windshield can be arbitrarily adjusted.

Incidentally, in the defroster blow mode, in order to maintain the antifog performance for the windshield, a total outer air mode is normally selected as the inner and outer air intake mode.

[Face Blow Mode]

FIG. 7 shows the maximum cooling state of a face blow mode.

The defroster opening portion 23 is fully closed by the defroster door 23a, and the three foot opening portions 25a, 25b, and 25c are fully closed by the respective foot doors 27a, 27b, and 27c. On the other hand, the face opening portion 24 is fully opened by the face door 24a.

In the maximum cooling state of the face blow mode, the air mix doors 11 and 12 are located at the lowermost positions as shown in FIG. 7. The defroster/face cool air passage 30 and the foot cool air passages 15 and 16 are fully opened by the upper air mix door 11, and at the same time, both the upper and lower sides of the heat exchange portion 8e of the heater core 8 are fully closed by the air mix doors 11 and 12.

However, even if the foot cool air passages 15 and 16 are fully opened, since the foot opening portions 25b and 25c at both the right and left sides and at the downstream side are fully closed, air does not flow to the foot cool air passages 15 and 16.

A cooling cycle for vehicle air conditioning is operated, and evaporation latent heat of the refrigerant is absorbed from the blown air at the evaporator 7, so that the air is cooled to become the cooled air. This cooled air passes through the defroster/face cool air passage 30 as shown by arrows F and G in FIG. 7, and all of the cooled air flows to the face opening portion 24. Thus, the cooled air is blown from the opening portion (blow-out port) of the not-shown face duct tip portion to the side of the upper half of the passenger in the passenger compartment and cools the inside of the passenger compartment.

In the maximum cooling state of the face blow mode, for the purpose of increasing the cooling capacity, a total inner air mode (that is, a mode in which inner air is introduced to both the first air passages 4, 9 and the second air passages 5 and 10) is normally selected as the intake mode of inner and outer air.

Figure 8:
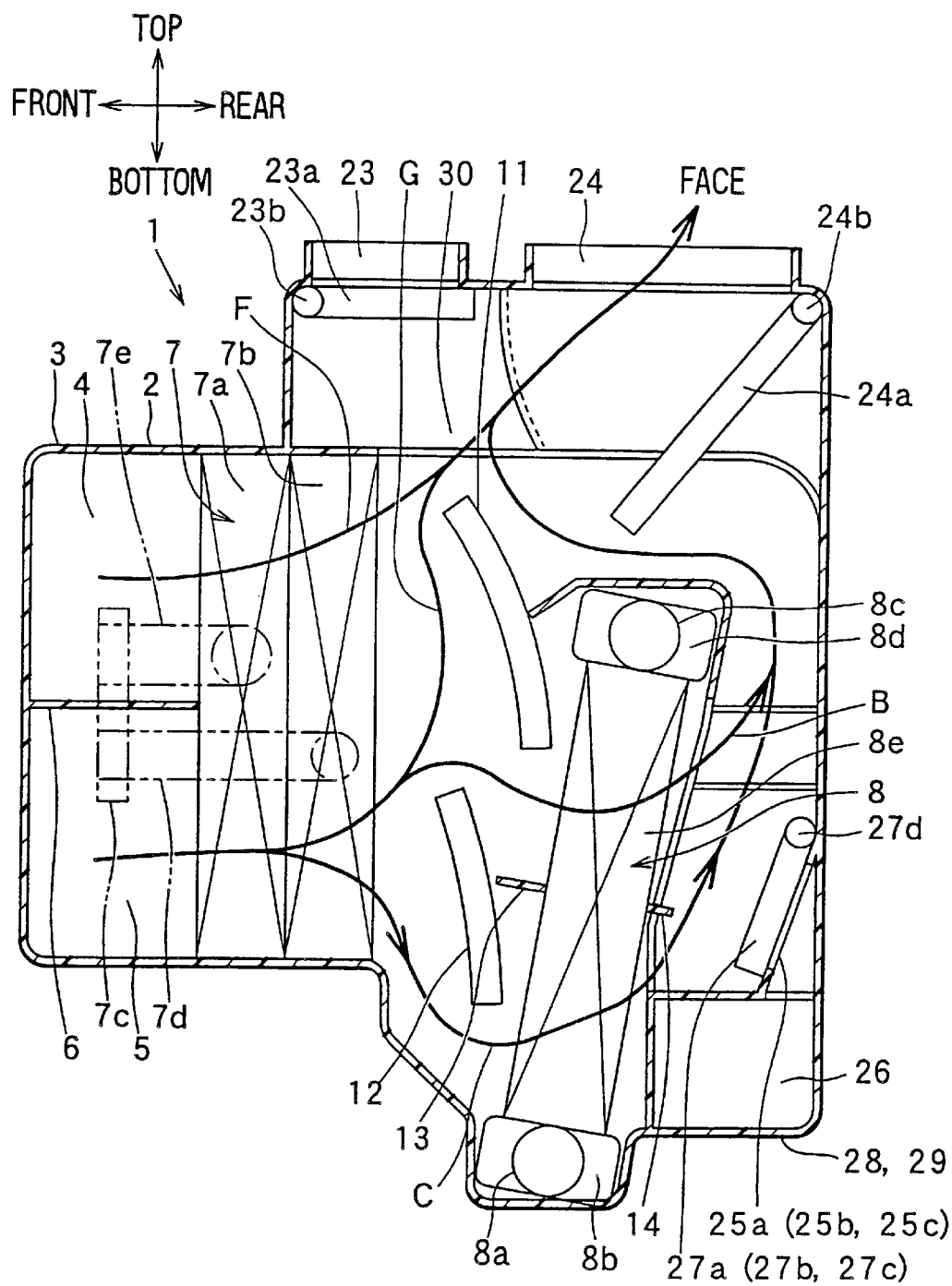
FIG. 8 is a longitudinal sectional view of the air conditioning unit with the temperature control state in the face blow mode according to the first embodiment.

FIG. 8 shows the temperature control state of the face blow mode. The difference between the maximum cooling state and the temperature control state of the face blow mode is that the air mix doors 11 and 12 are displaced from the maximum cooling position of the lowermost portion to the intermediate position. According to the displacement of the air mix doors 11 and 12, the defroster/face cool air passage 30 is narrowed from the fully opened state to a predetermined opening degree, and the warm air passages (arrows B and C in FIG. 8) passing through the heat exchange portion 8e of the heater core 8 are opened by a predetermined opening degree.

As a result, the warmed air having passed through the heat exchange portion 8e of the heater core 8 flows toward the face opening portion 24 as shown by arrows B and C, and the cooled air having passed through the evaporator 7 passes through the defroster/face cool air passage 30 as shown by arrows F and G and flows toward the face opening portion 24.

Thus, at the inlet side of the face opening portion 24, the warmed air and the cooled air are mixed to form cooled air with a predetermined temperature. This cooled air is blown from the opening portion (blow-out port) of the not-shown face duct tip portion to the side of the upper half of the passenger in the passenger compartment, and cools the inside of the passenger compartment.

Incidentally, in the temperature control state of the face blow mode, for the purpose of securing the ventilation function, a semi-inner mode in which inner air is mixed with outer air or a full outer mode is normally selected as the intake mode of outer and inner air.

[Bilevel Blow Mode]

Figure 9:
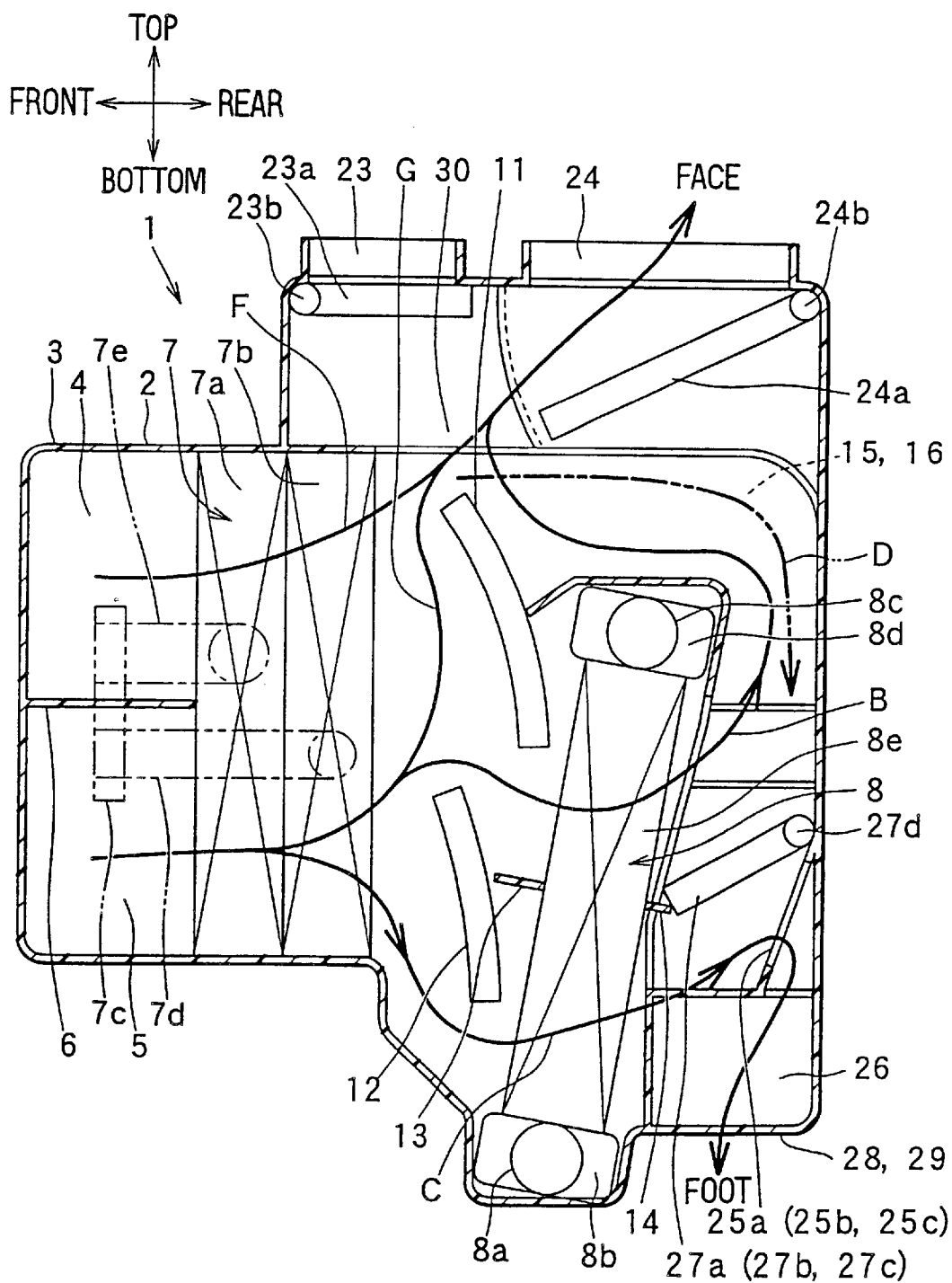
FIG. 9 is a longitudinal sectional view of the air conditioning unit with the bilevel blow mode according to the first embodiment.
Figure 10:
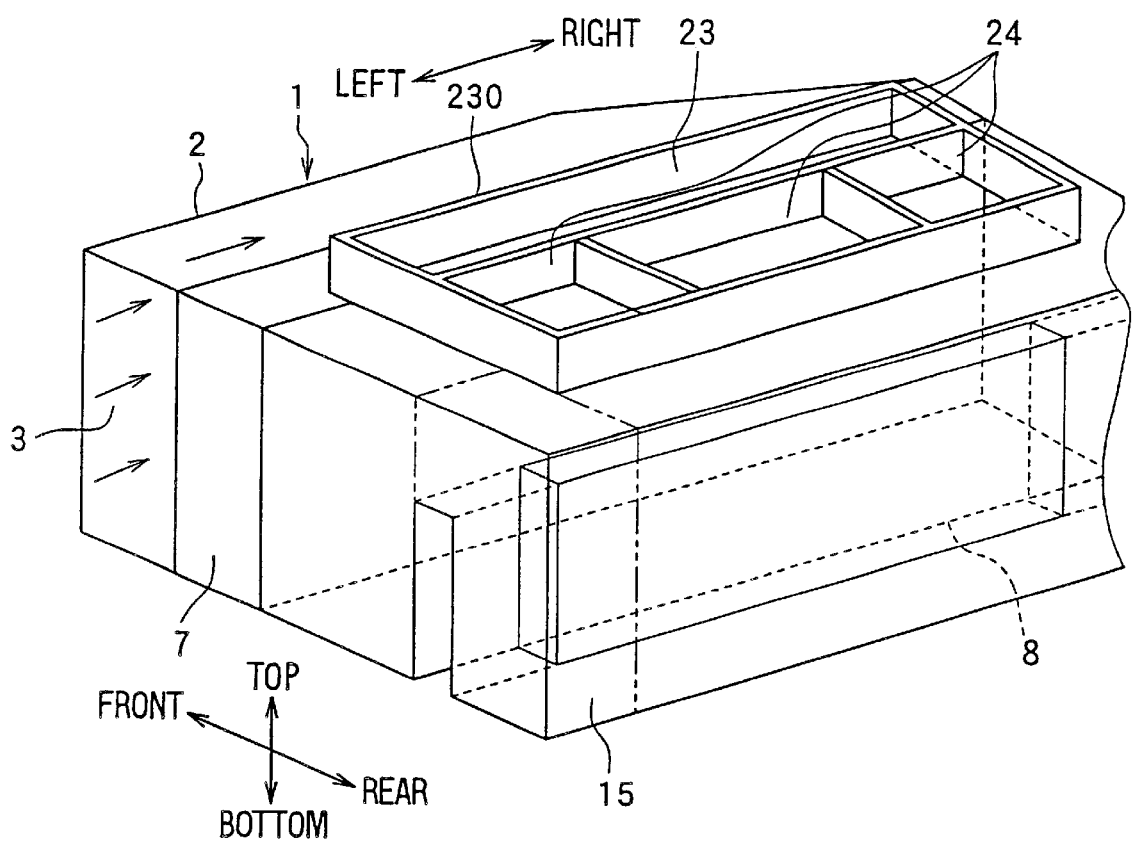
FIG. 10 is a schematic perspective view of an air conditioning unit according to a second embodiment of the present invention.

FIG. 9 shows a bilevel blow mode. The defroster opening portion 23 is fully closed by the defroster door 23a. On the other hand, the foot opening portions 25a, 25b, and 25c are fully opened by the respective foot doors 27a, 27b, and 27c, and similarly, the face opening portion 24 also becomes in a state with an intermediate opening degree by the face door 24a.

The air mix doors 11 and 12 are located at the intermediate position between the maximum cooling position and the maximum heating position. As a result, the cooled air shown by arrows F and G and having passed through the evaporator 7 and the warmed air shown by arrow B and having passed through the upper side of the heat exchange portion Be of the heater core 8 flow toward the face opening portion 24, and mixed air of this cooled air and the warmed air is blown from the side of the face opening portion 24 to the upper side in the passenger compartment.

At the same time, the warmed air shown by arrow C and having passed through the lower side of the heat exchange portion 8e of the heater core 8 passes through the foot opening portion 25a at the central portion and flows in the air mixing chamber 26. Part of the cooled air immediately after the evaporator 7 passes through the foot cool air passages 15 and 16 as shown by arrow D, and further passes through the foot opening portions 25b and 25c at both the right and left sides and flows in the air mixing chamber 26. This warmed air and the cooled air are mixed in the air mixing chamber 26, and are blown to the passenger foot portion from the foot opening portions (blow-out ports) 28 and 29 at both the right and left sides.

Incidentally, in the bilevel blow mode, for the purpose of securing-the ventilation function, a semi-inner air mode or a full outer air mode is normally selected as the intake mode of inner and outer air.

The detailed design of this embodiment will now be described.

The width W of the air conditioning unit 1 (evaporator 7) in the vehicle right-and-left direction is 460 mm as described before, and on the other hand, the width $W_0$ of the heater core 8 in the vehicle right-and-left direction is about 70% of W, specifically, 300 mm.

The inventors of the present invention carried out experiments and studied the relation between the width W and the width $W_0$, and it has been found that it is preferable to set $W_0=(0.6 \text{ to } 0.8) \times W$ for controlling the foot blow temperature and for securing the heating capacity of the heater core 8.

That is, if $W_0$ is made greater than $0.8 \times W$, the width $W_1$ of the foot cool air passages 15 and 16 in the vehicle right-and-left direction becomes small. Specifically, in the case of W=460 mm, $W_0$ and $W_1$ become $W_0$=460 mm×0.8= 368 mm, and $W_1$=(460 mm−368 mm)/2=46 mm. Like this, when the width $W_1$ of the foot cool air passages 15 and 16 becomes 46 mm or less, the amount of cooled air flown from the foot cool air passages 15 and 16 to the air mixing chamber for foot 26 is decreased, so that there occurs a disadvantage that the foot blow temperature becomes excessively high by insufficiency of the amount of the cooled air. Thus, in the foot mode and the foot defroster mode, the difference between the upper and lower blow temperatures may become excessively large, so that the feeling of air conditioning may be compromised.

If $W_0$ is made lower than $0.6 \times W$, in the case of W=460 mm, $W_0$=460 mm×0.6=276 mm, and $W_1$=(460 mm−276 mm)/2=92 mm. Although $W_1$ is kept large enough, the width $W_0$ of the heater core 8 is decreased, and the heat conduction area of the heat exchange portion 8e of the heater core 8 is decreased, so that it becomes difficult to secure the heating capacity.

From the above reasons, it is preferable to set $W_0$ within the range between $(0.6 \times W)$ and $(0.8 \times W)$ for the establishment of controllability of foot blow temperature and securing the heating capacity of the heater core 8.

Second Embodiment

A second embodiment of the present invention is shown in FIGS. 10 to 14. In this and the following embodiments, components which are substantially the same as those in previous embodiments are assigned the same reference numerals.

In the first embodiment, as shown in FIG. 2, since the size of the defroster opening portion 23 in the vehicle right-and-left direction is set comparable with the width W of the air conditioning unit 1 (evaporator 7) in the vehicle right-and-left direction, at the temperature control of the foot mode (or foot defroster mode) shown in FIG. 4, there occurs a phenomenon that cooled air after the evaporator 7 is apt to flow into the defroster opening portion 23.

Accordingly, there arises a disadvantage that the amount of cooled air flown from the foot cool air passages 15 and 16 into the foot air mixing chamber 26 is decreased, so that foot blow temperature becomes excessively high by insufficiency of the amount of cooled air. Thus, in the foot mode and the foot defroster mode, the difference between upper and lower blow temperatures is excessively increased, so that the feeling of air conditioning may be compromised.

Then, in the second embodiment, as shown in FIGS. 10 to 13, the size $W_2$ of the defroster opening portion 23 in the vehicle right-and-left direction is made smaller than the width W of the air conditioning unit 1 (evaporator 7) in the vehicle right-and-left direction by a predetermined amount. Specifically, in the case of W=460 mm, for example, the size is decreased to about $W_2$=350 mm.

In this example, the defroster opening portion 23 is designed to have the same width $W_2$ as the face opening portion 24 in the vehicle right-and-left direction, and both the defroster opening portion 23 and the face opening portion 24 are arranged at the central portion of the case 2 of the air conditioning unit 1 in the vehicle right-and-left direction.

Here, the rotation space for the defroster door 23a is defined between the position (closed position of the defroster opening portion 23) shown by a two-dot-chain line in FIG. 11A and the position (fully opened position of the defroster opening portion 23) shown by a broken line in FIG. 11A. A wall surface 230 for dividing the defroster opening portion 23 is formed in such a manner that as shown in FIG. 11A, the width $W_2$ of the defroster opening portion 23 in the vehicle right-and-left direction is narrowed in the portion at this side (vehicle front side) of the rotation space of the defroster door 23a in the vehicle rear-and-front direction.

Thus, the flow of cooled air having passed through the evaporator 7 is uniformly narrowed at both sides in the vehicle right-and-left direction, and the cooled air flows in the side of the defroster opening portion 23.

Accordingly, the amount of cooled air flows into the foot air mixing chamber 26 from the foot cool air passages 15 and 16 is increased, so that at the temperature control of the foot mode (or foot defroster mode), it becomes possible to prevent the foot blow temperature from becoming excessively high by insufficiency of the amount of cooled air, and it becomes possible to obtain suitable upper and lower blow temperature difference in view of the feeling of air conditioning.

Figure 12:
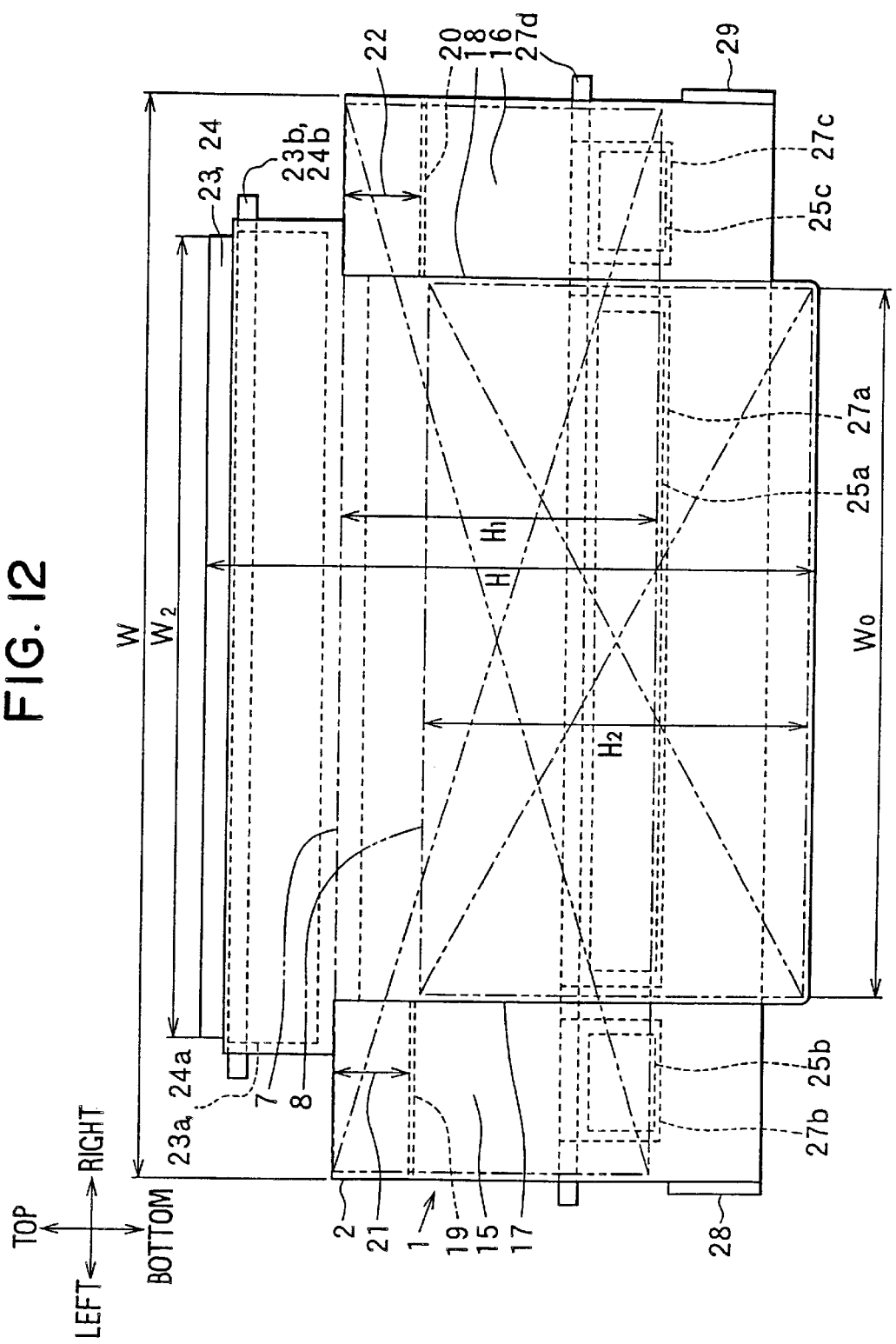
FIG. 12 is a schematic front view of the air conditioning unit according to the second embodiment.
Figure 13:
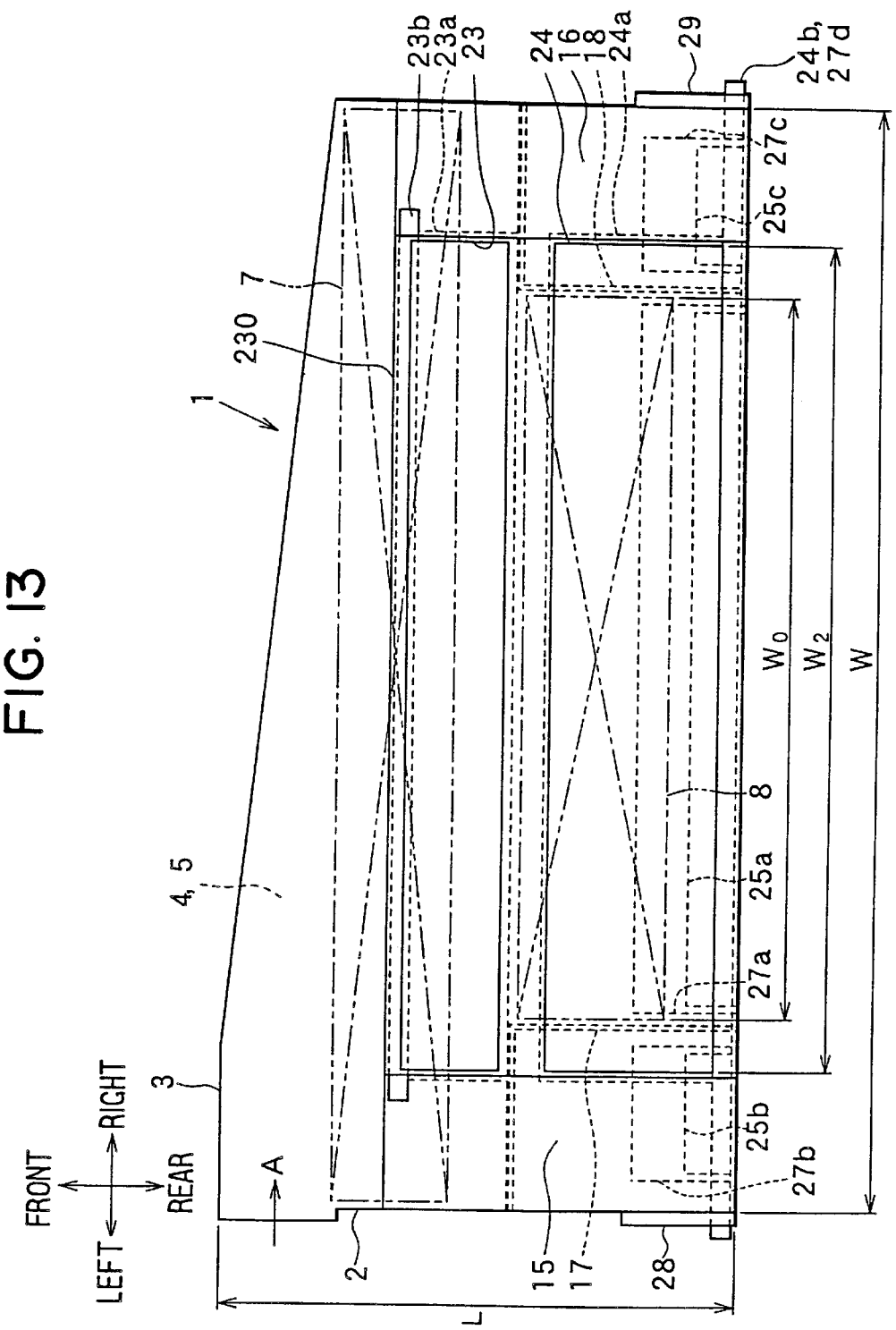
FIG. 13 is a schematic top view of the air conditioning unit according to the second embodiment.

Besides, since the air conditioning unit of the second embodiment is originally formed into an oblong shape as shown in FIGS. 12 and 13, although the width size $W_2$ of the defroster opening portion 23 in the vehicle right-and-left direction is made smaller than the width size W of the air conditioning unit 1 (evaporator 7) in the vehicle right-and-left direction, as compared with a normal air conditioning unit, it is possible to set the defroster opening portion 23 having a comparable or larger opening area. Thus, there does not occur a problem of decrease of the amount of air blown from the defroster opening portion 23 or the face opening portion 24. Besides, there occurs no problem in connection of ducts to these opening portions 23 and 24.

Furthermore, since the defroster opening portion 23 and the face opening portion 24 are arranged at the central portion of the case 2 in the vehicle right-and-left direction, the right and left protruding sizes of the evaporator 7 in the vehicle right-and-left direction relative to the opening portions 23 and 24 are symmetrical, so that the distribution of blown air temperature to the right and left is uniform.

Figure 14:
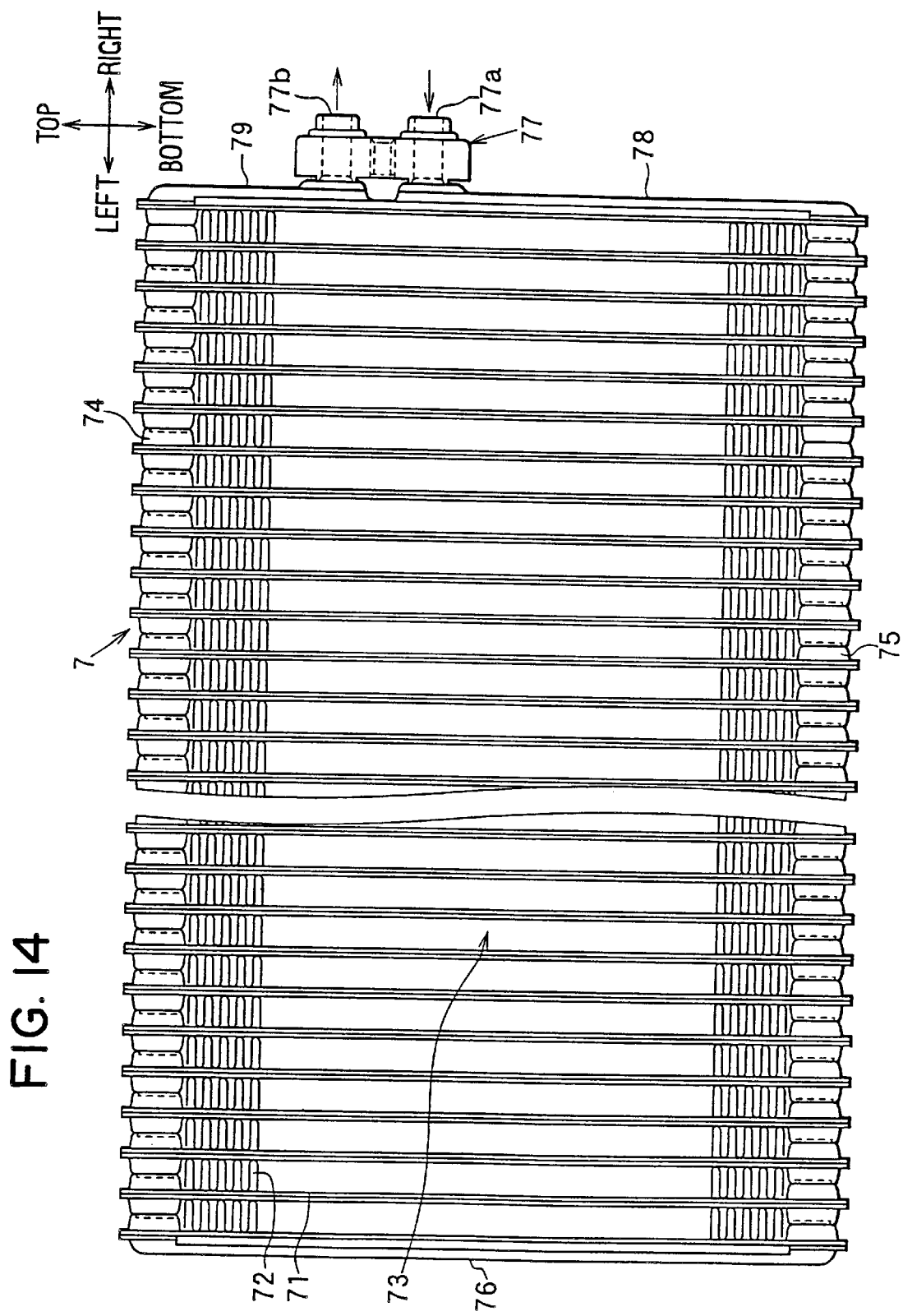
FIG. 14 is a part of a front view of an evaporator according to the second embodiment.

FIG. 14 shows a specific example of the evaporator 7 used in the second embodiment. A flat tube 71 in which refrigerant flows is structured in such a manner that one aluminum thin plate is bent or two aluminum thin plates are bonded to form a cavity inside the plates. Such tubes 71 and corrugated fins 72 are alternately stacked on each other and are integrally brazed to form a core portion 73 for heat exchange. Air passes through the core portion 73 for heat exchange in the vertical direction to the paper sheet of FIG. 14.

Here, the evaporator 7 is arranged such that the flat tube 71 extends in the top-and-bottom direction (vertical direction). Tank portions 74 and 75 for distributing the refrigerant flow to the refrigerant passages in the flat tubes 71 and for collecting refrigerant flow from the refrigerant passages are integrally formed at both the upper and lower ends of the flat tube 71s. As well known, a communication hole (not shown) is bored in the top of the tank portions 74 and 75, and the passages of the adjacent tank portions 74 and 75 are communicated with each other through this communication hole.

A side refrigerant passage 76 for communicating the upper tank portion 74 with the lower tank portion 75 is arranged at the left side end of the core portion 73 for heat exchange. A refrigerant piping joint 77 is arranged at the right side end of the core portion 73 for heat exchange. A refrigerant inlet 77a of this joint 77 communicates with the lower tank portion 75 through a side refrigerant passage 78. A refrigerant outlet 77b of the joint 77 communicates with the upper tank portion 74 through a side refrigerant passage 79.

According to the evaporator 7 shown in FIG. 14, the refrigerant flows in the top-and-bottom direction through the refrigerant passage in the flat tube 71, so that the temperature distribution of the evaporator blow air temperature (cooled air temperature) in the vehicle right-and-left direction is made uniform.

Third Embodiment

Figure 15:
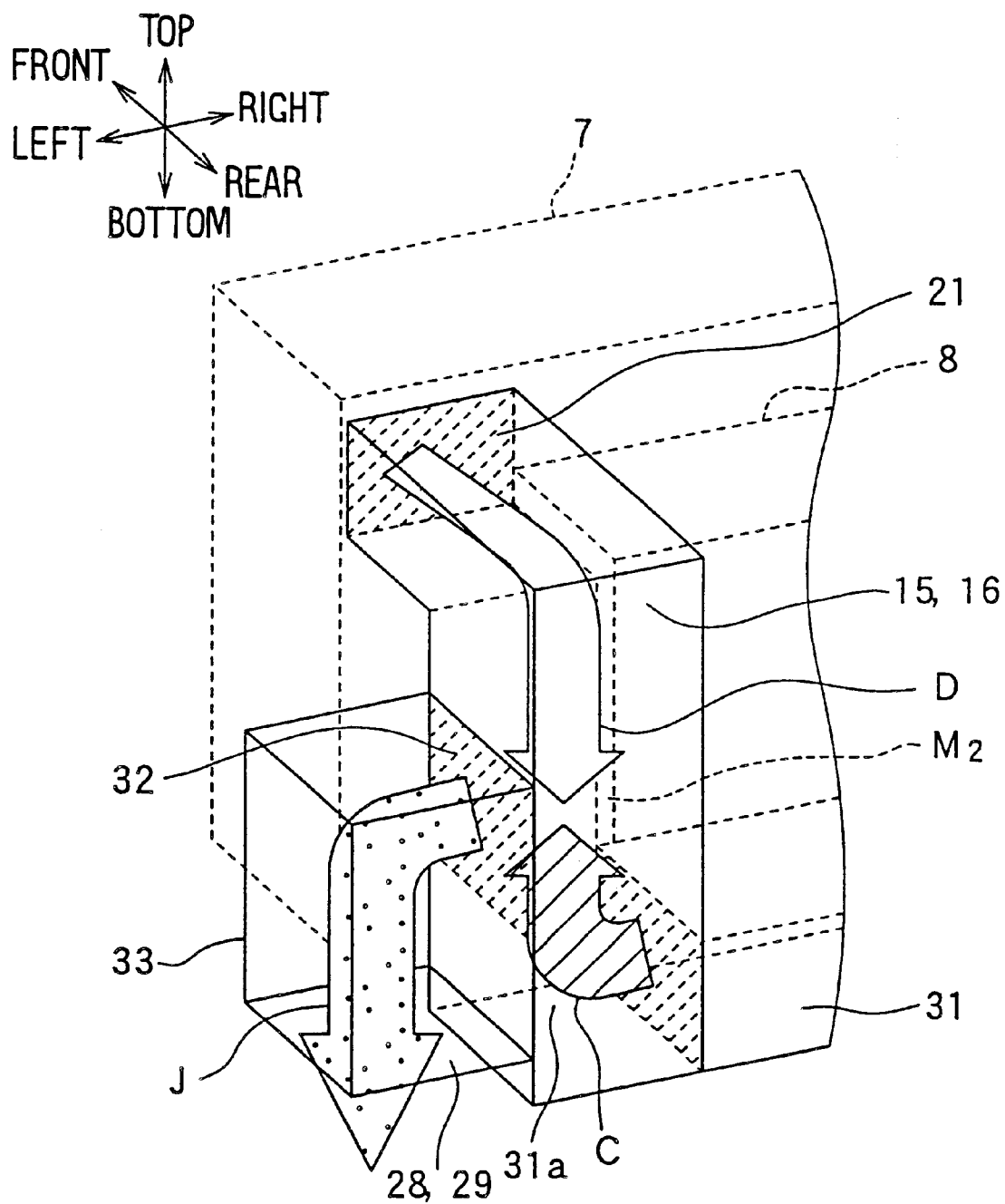
FIG. 15 is a schematic perspective illustration showing a part of a foot side cooled and warmed air mixing mechanism according to a third embodiment of the present invention.

A third embodiment of the present invention is shown in FIG. 15. The third embodiment improves the mixing performance of the cooled air and warmed air at the foot side in the first and second embodiments.

Figure 16:
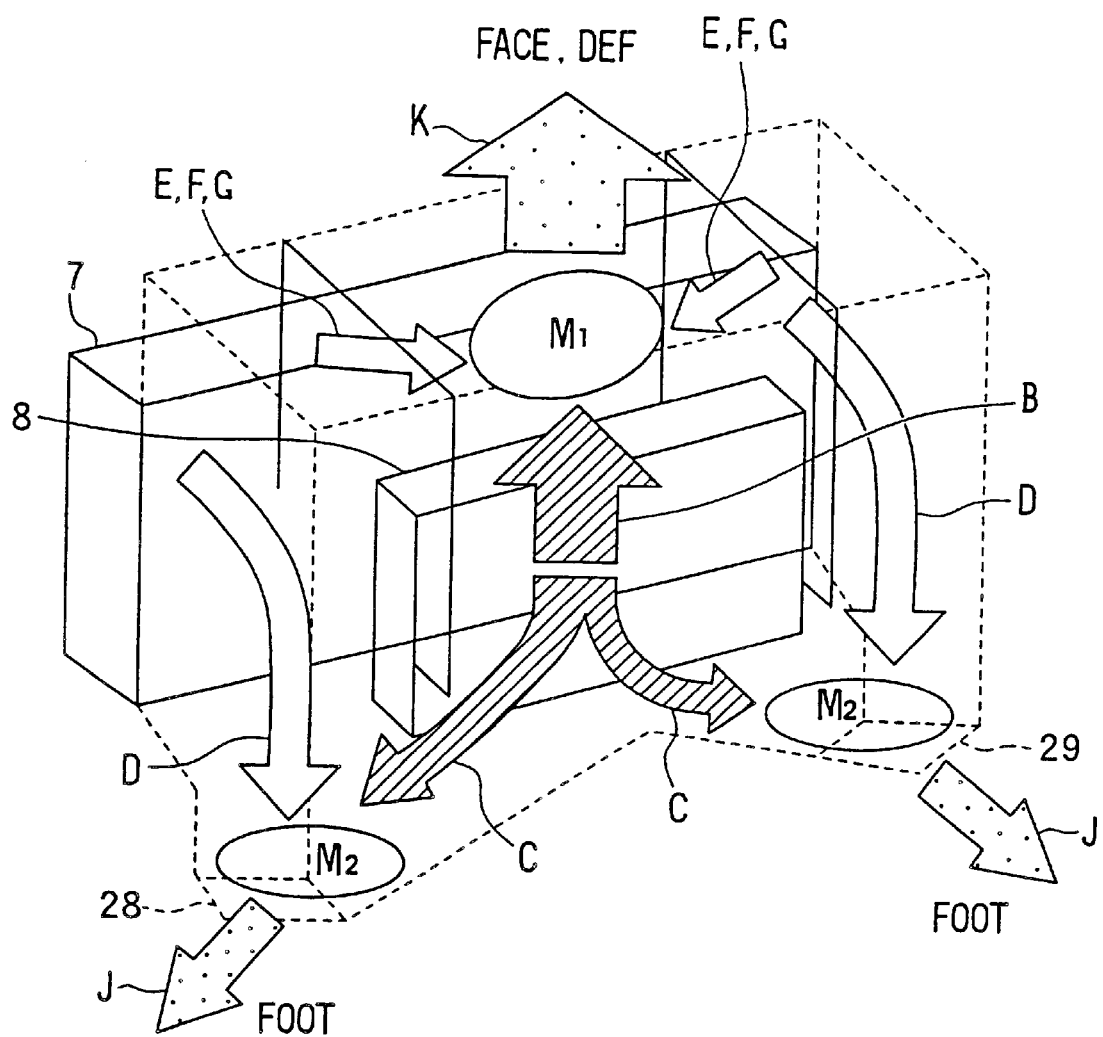
FIG. 16 is a schematic perspective illustration showing a cooled and warmed air mixing mechanism at a defroster side and a face side, and a cooled and warmed air mixing mechanism at a foot side according to the first and second embodiments.

FIG. 16 is an explanatory view showing mixtures of cooled air and warmed air in the first and second embodiments. Arrows E, F, G represent cooled air flowing through the defroster/face cool air passage 30 to a defroster/face mixing portion $M_1$. Arrow B represents warmed air flowing to the defroster/face mixing portion $M_1$ after passing through the heater core 8. The cooled air E, F, G and the warmed air B are mixed in the mixing portion $M_1$, and after a desired temperature is obtained, the mixed air flows toward the defroster opening portion 23 or the face opening portion 24 as represented by arrow K.

On the other hand, arrow D represents cooled air flowing through the foot cool air passages 15 and 16 to a foot mixing portion $M_2$ at the inlet portion of the foot opening portions 28 and 29. Arrow C represents warmed air flowing through the heater core 8 toward the foot mixing portion $M_2$. After the cooled air D and the warmed air C are mixed in the foot mixing portion $M_2$ and a desired temperature is obtained, the mixed air is blown into the inside of a passenger compartment from the foot opening portion 28 and 29 as shown by arrow J.

When the mixtures of the cooled air and the warmed air shown in FIG. 16 are actually tested and studied by the inventors, it has been found that the mixing performance of the cooled air and the warmed air at the foot side greatly varies according to specifications of the mixture design, and temperature fluctuation of the blown air from the foot opening portions 15 and 16 is greatly changed.

Figure 17A:
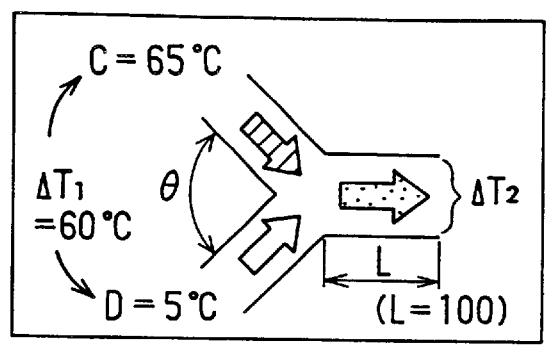
FIGS. 17A to 17C are explanatory illustrations showing experimental methods for the cooled and warmed air mixing performance according to the third embodiment.
Figure 17B:
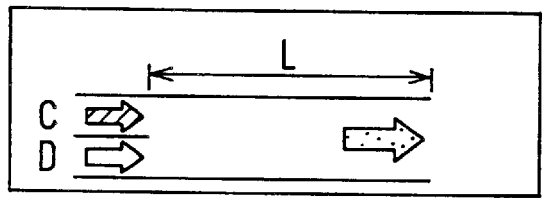
Figure 17C:
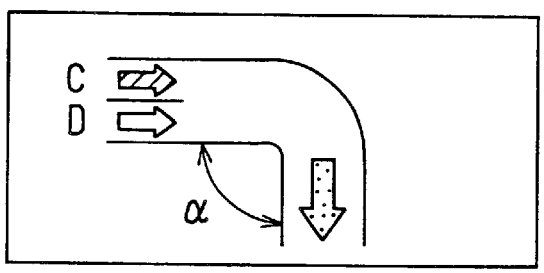

FIGS. 18 to 21 show experimental results carried out by the inventors. FIGS. 17A to 17C are explanatory illustrations for explaining the method of the experiments according to the third embodiment. FIG. 17A explains a collision angle θ in the horizontal axis of FIG. 18, and the collision angle θ of the cooled and warmed air is a crossing angle between the flow path of the warmed air C in FIG. 16 and the flow path of the cooled air D in FIG. 16. Here, as experimental conditions, the temperature of warmed air C is made 65° C., the temperature of cooled air D is made 5° C., and temperature difference $\Delta T_1$ between the warmed air C and the cooled air D is made 60° C.

Figure 18:
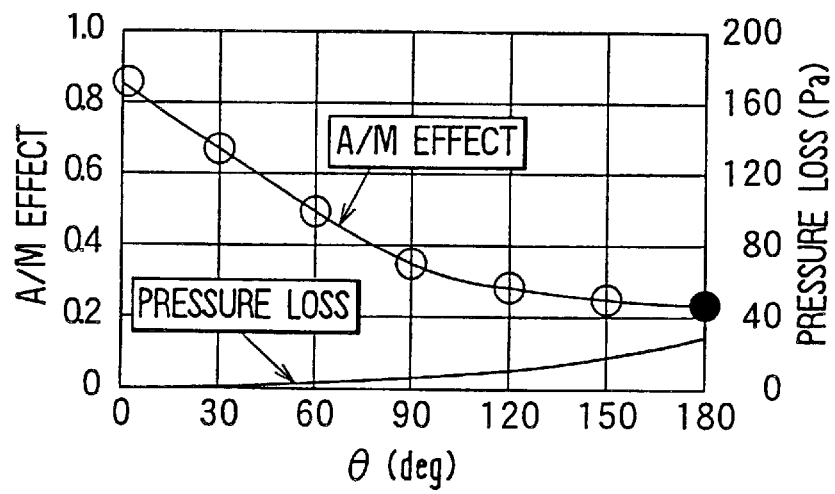
FIG. 18 is a graph showing experimental results of the air mixing performance with respect to a collision angle θ according to the third embodiment.

After the flow path of the warmed air C and the flow path of the cooled air D cross each other (in other words, after the mixing portion $M_2$ of the cooled air and the warmed air is formed), measurements were made on the relation between the collision angle θ and the A/M effect when a duct length L, which is a length from the crossing point to the foot opening portions 28 and 29 which are actual blow-out ports to the passenger compartment, is made L=100 mm, and the results shown in FIG. 18 were obtained.

Here, the A/M effect is an index for the mixing performance of cooled air and warmed air. When the temperature difference between the cooled air and the warmed air before mixture is $\Delta T_1$, and the difference between the lowest temperature and highest temperature (temperature fluctuation) of the air blown into the passenger compartment is $\Delta T_2$, the A/M effect is defined as A/M effect=$\Delta T_2/\Delta T_1$.

As understood from the results shown in FIG. 18, as the collision angle θ increases from 0° to 180°, the A/M effect ($\Delta T_2/\Delta T_1$) decreases, and the mixing performance of the cooled air and the warmed air is improved. Particularly at the collision angle θ=180°, the A/M effect ($\Delta T_2/\Delta T_1$) is lowered to the vicinity of 0.2. This means that the temperature fluctuation of the blown air into the passenger compartment is reduced to about 12° C.

According to the increase of the collision angle θ, the collision between the warmed air C and the cooled air D becomes harder, so that the pressure loss at the air passages in the entire air conditioning unit is increased to some degree as shown in FIG. 18. However, the level of the increase is not so large, and there is no problem in practical use. In FIG. 18, the collision angle θ=90° corresponds to the mixing mode of the cooled air and warmed air at the foot side in the first and second embodiments.

Figure 19:
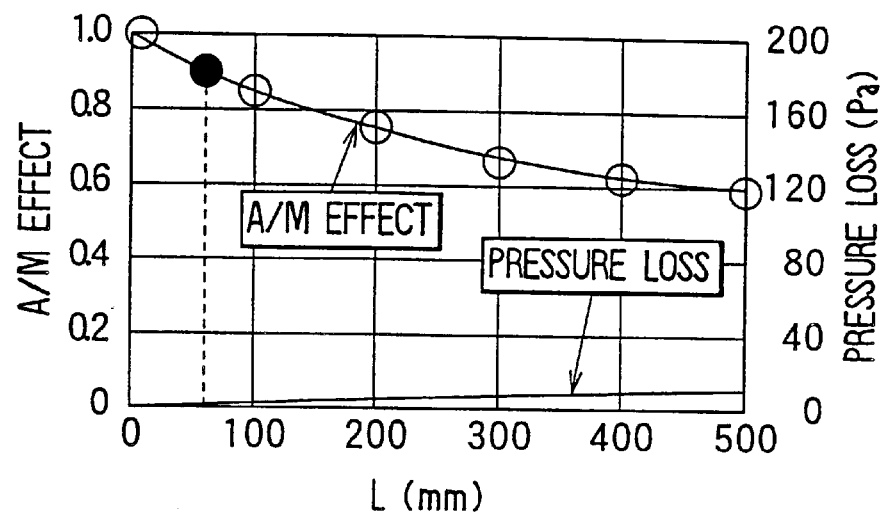
FIG. 19 is a graph showing experimental results of the air mixing performance with respect to a duct length L according to the third embodiment.

FIG. 19 shows the change of the A/M effect when the duct length L at the downstream side of the cooled and warmed air mixing portion $M_2$ varies under the condition that the collision angle θ=0° as shown in FIG. 17B. As understood from FIG. 19, when the duct length L is increased, the A/M effect ($\Delta T_2/\Delta T_1$) is decreased, and the mixing performance of the cooled air and the warmed air is improved.

Figure 20:
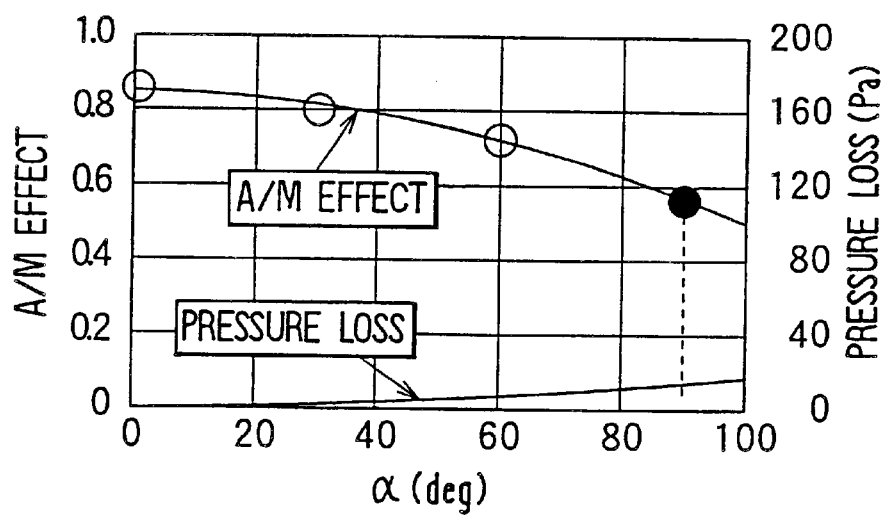
FIG. 20 is a graph showing experimental results of the air mixing performance with respect to a duct bent angle α according to the third embodiment.

FIG. 20 shows the change of the A/M effect when a duct bent angle α at the downstream side of the cooled and warmed air mixing portion varies under the condition that the collision angle θ=0°. As understood from FIG. 20, when the duct bent angle α is increased, the A/M effect ($\Delta T_2/\Delta T_1$) is decreased, and the mixing performance of the cooled air and the warmed air is improved, and especially when the bent angle α is ninety degrees (α=90°), the A/M effect is lowered to 0.6 or less, and the mixing performance of cooled air and warmed air becomes remarkable.

Figure 21:
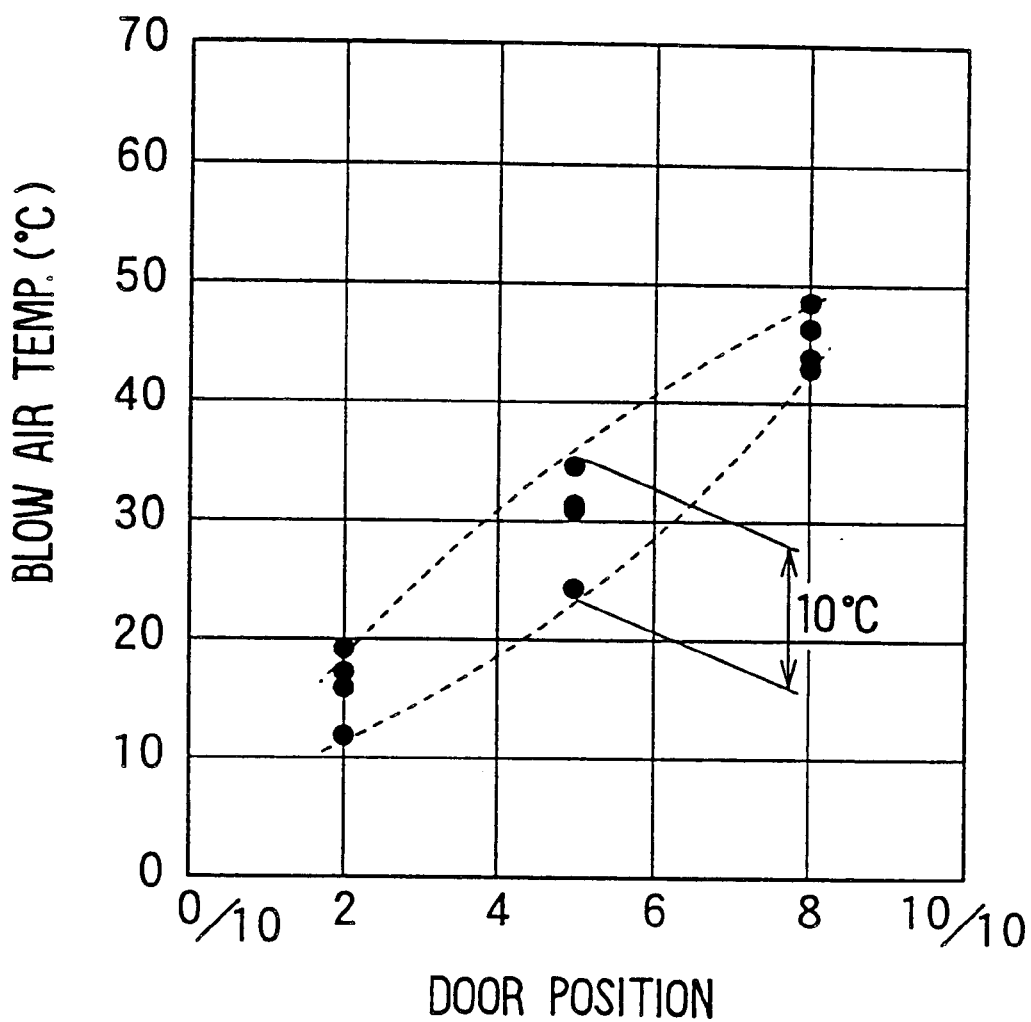
FIG. 21 is a graph showing experimental results of blowing temperature fluctuation according to the third embodiment.

FIG. 21 shows the results of synthesis of the results in FIGS. 18 to 20, and shows data indicating the relation between the blow air temperature blown into the passenger compartment and the air mix door operational position under the condition that the collision angle θ=180°, the duct length L=60 mm, and the duct bent angle α=90°.

Here, the air mix door operational position=0/10 in the abscissa corresponds to the maximum cooling position where the cool air passages 15, 16 and 30 are fully opened and the airflow passage of the heater core 8 is fully closed. The air mix door operational position=10/10 corresponds to the maximum heating position where the cool air passages 15, 16, 30 are fully closed and the airflow passage of the heater core 8 is fully opened. The abscissa of FIG. 21, which represents the air mix door operational position, is divided into five regions between 0/10 and 10/10.

As shown in FIG. 21, within the range of the air mix door operational position=2/10 to 8/10, the temperature fluctuation of the blown air blown into the passenger compartment is less than 10° C.

Taking the experimental results into consideration, FIG. 15 shows a specific example (only one side in the vehicle right-and-left direction is shown) of a cooled and warmed air mixing portion at the foot side according to the third embodiment. After the warm air passage 31 in which the warmed air from the foot opening portion 25a (see FIGS. 1 to 3) positioned at the central portion in the vehicle right-and-left direction flows, is formed along the vehicle right-and-left direction, its end 31a is bent toward the upper portion.

On the other hand, cooled air from the foot cool air passages 15 and 16 passes through the upper portion of the heater core 8 at both sides in the vehicle right-and-left direction of the heater core 8 similarly to the first and second embodiments, and then, the cooled air flows toward the lower side of the heater core 8. Thus, it is possible to arrange the lower ends of the foot cool air passages 15 and 16 and the end portion 31a of the warm air passage 31 bent upwardly such that they oppose to each other (the collision angle $\theta=180°$).

Accordingly, the foot cool and warmed air mixing portion $M_2$, where the cooled air D and the warmed air C collide with each other at a collision angle $\theta=180°$ to make substantially a head-on collision, is formed at the joint portion between the lower ends of the foot cool air passages 15 and 16 and the end 31a of the warm air passage 31 bent upwardly. Incidentally, in FIG. 15, for simplification of the drawing, the right and left foot opening portions 25b and 25c in the vehicle right-and-left direction are not shown. However, the right and left foot opening portions 25b and 25c are arranged on the portion right above the cooled and warmed air mixing portion $M_2$, and are opened and closed by the second foot doors 27b and 27c (not shown in FIG. 15).

Air obtained by mixing the cooled air and the warmed air at the cooled and warmed air mixing portion $M_2$ passes through a cooled and warmed air outlet 32 positioned adjacent to the side of the cooled and warmed air mixing portion $M_2$, and passes through a blow-out duct 33. This blow-out duct 33 has such a shape that air flow from the cooled and warmed air outlet 32 is vertically bent downward as shown by arrow J, and the duct bent portion of a substantially rectangular shape in FIG. 17C is obtained by this blow-out duct 33.

Since the lower end of the blow-out duct 33 constitutes the foot opening portions 28 and 29 for blowing air to the foot portion of the passenger in the passenger compartment, the duct length L shown in FIG. 17B is determined by the blow-out duct 33.

Fourth Embodiment

Figure 22:
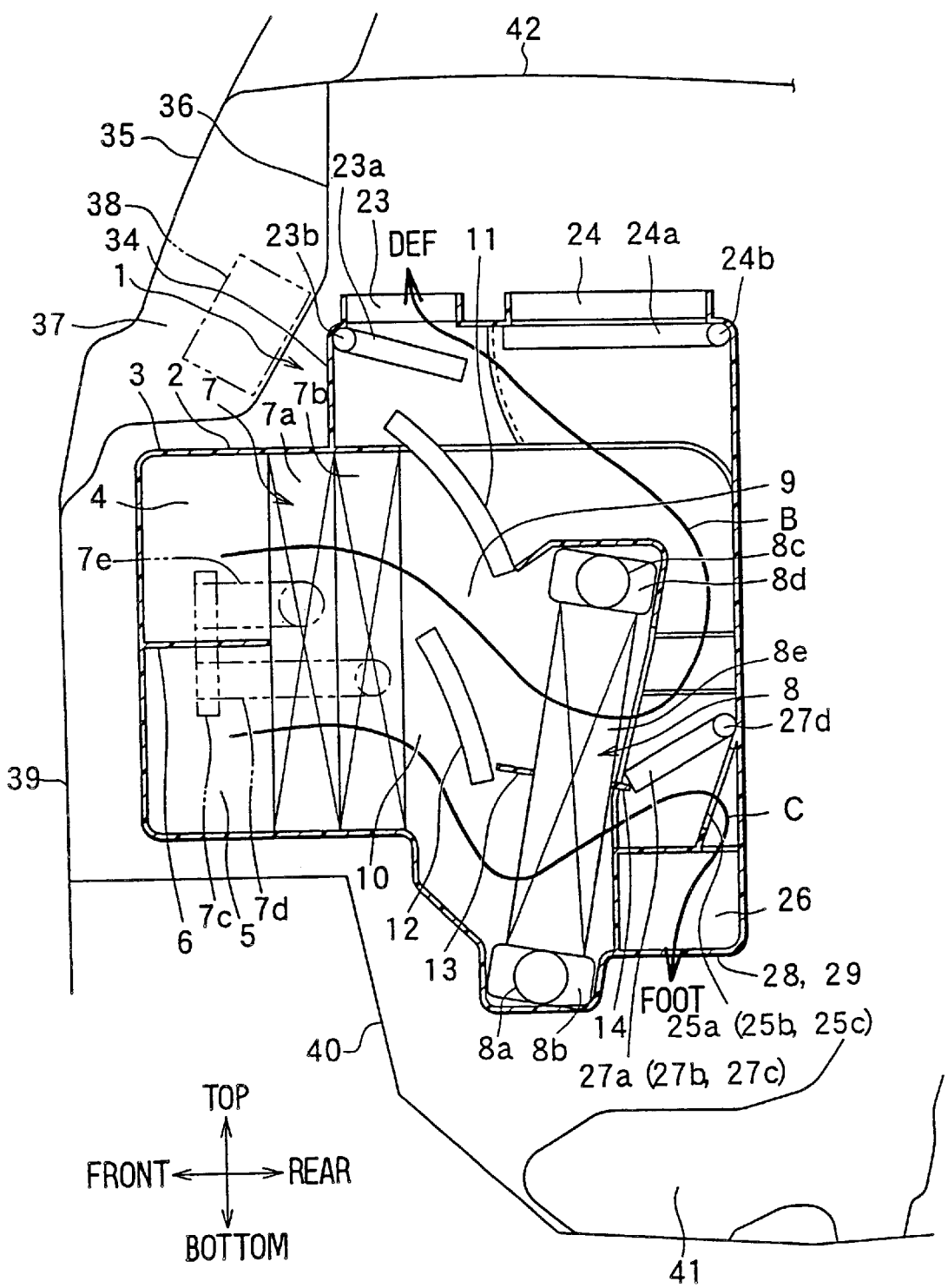
FIG. 22 is a longitudinal sectional view of a vehicle-mounted air conditioning unit with the maximum heating state in the foot blow mode according to a fourth embodiment of the present invention.

A fourth embodiment of the present invention is shown in FIG. 22. FIG. 22 shows a mounted state of the air conditioning unit 1 described in the first embodiment on a vehicle. Since the air conditioning unit 1 has a flat oblong shape as described before (for example, size W=460 mm, size H=250 mm, size L=230 mm), by using the fact that the defroster opening portion 23 and the face opening portion 24 arranged on the upper surface of the air conditioning case 2 are oblong, even if the size in the vehicle front-and-rear direction is made small, a necessary opening area is secured.

Thus, the defroster opening portion 23 and the face opening portion 24 at the upper surface of the air conditioning case 2 can be arranged in a portion near the rear side of the vehicle. Accordingly, a lower stepped portion 34 is formed on the upper surface of the air conditioning case 2 at the vehicle front side of the defroster opening portion 23.

Besides, an inner panel 36 of a cowl panel 35 is made to have a shape protruding rearward of the vehicle at the front side of the air conditioning unit 1, and a space 37 between the cowl panel 35 and the inner panel 36 is enlarged in the vehicle front-and-rear direction, so that vehicle equipment such as a wiper link mechanism 38 can be installed in this space 37.

According to the mounting structure of the fourth embodiment, since the lower stepped portion 34 is formed at the front side of the upper surface of the air conditioning case 2, even if the inner panel 36 greatly protrudes toward the rear side of the vehicle, the interference between this protruding shape and the upper surface of the air conditioning case 2 is easily prevented.

Incidentally, in FIG. 22, the reference numeral 39 denotes a dash panel for partitioning the inside of the passenger compartment from the engine compartment, and the reference numeral 40 denotes a floor panel of the passenger compartment, and the reference numeral 41 denotes a passenger's foot in the passenger compartment, and the reference numeral 42 denotes an instrument panel.

Fifth Embodiment

Figure 23:
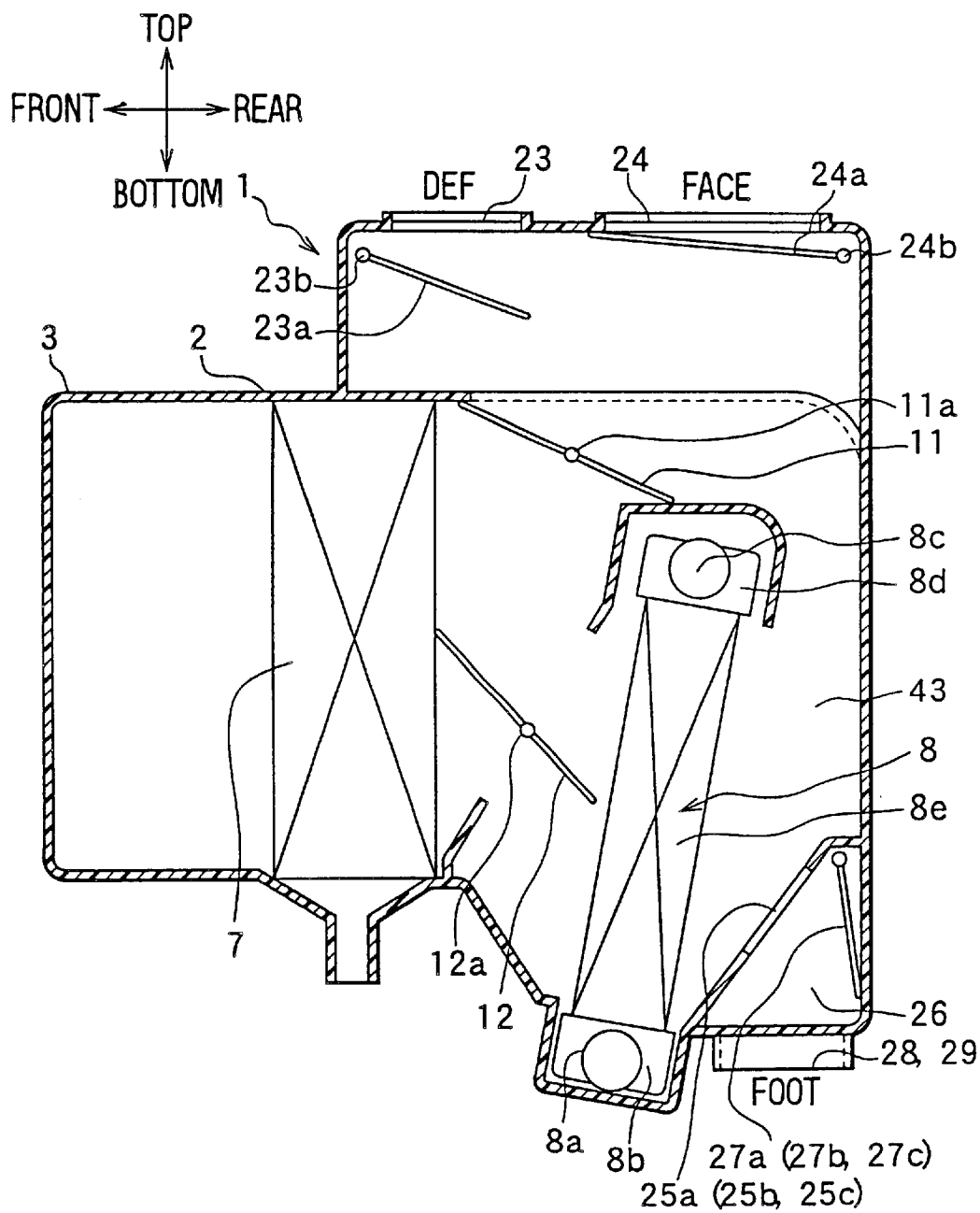
FIG. 23 is a longitudinal sectional view of an air conditioning unit with the maximum heating state in the foot blow mode according to a fifth embodiment of the present invention.

A fifth embodiment of the present invention is shown in FIG. 23.

In the first to fourth embodiments described above, the inner and outer air double layer flow mode, in which inner air flows in the foot opening portions 28 and 29 and outer air flows in the defroster opening portion 23, is selected in the foot mode and the foot defroster mode in which both the foot opening portions 28 and 29 and the defroster opening portion 23 are opened at the same time. However, the fifth embodiment does not employ such an inner and outer air double layer flow mode for the air conditioning unit 1.

In the first to fourth embodiments, the first foot door 27a at the central portion is, as shown in FIGS. 3 and 5, operated to the opened position of the foot opening portion 25a at the foot mode and the foot defroster mode. Further, the tip portion of the first foot door 27a contacts with the partition plate 14. Thus, at the downstream side of the heater core 8, the first foot door 27a also functions as a partition member for partitioning the air passage into the first air passage 9 for the outer air and the second air passage 10 for the inner air.

In the first through fourth embodiments, it is indispensable to arrange the first foot door 27a in the warm air passage immediately after the downstream side of the heater core 8. Accordingly, the airflow resistance of the warm air passage is increased by the first foot door 27a, and the flow amount of the warmed air is reduced.

On the other hand, since the air conditioning unit 1 of the fifth embodiment does not employ the inner and outer air double layer flow mode, it is not necessary to make the first foot door 27a function as a partition member for partitioning the inner air and the outer air.

Then the first foot door 27a at the central portion and the second foot doors 27b and 27c at both the right and left sides are located in the air mixing chamber 26 at the downstream side of the foot opening portions 25a, 25b, and 25c. In other words, the first foot door 27a and the second foot doors 27b and 27c are located at the inlet side of the foot opening portions 28 and 29.

According to the fifth embodiment, a foot door which reduces the air flow amount is obviated from a warm air passage 43 immediately after the heater core 8, and the flow amount of the warmed air is increased by decreasing the airflow resistance of the warm air passage 43.

Incidentally, since the inner and outer air double layer flow mode is not employed in the fifth embodiment, the partition plates 6, 13 and 14 (see FIG. 3) are obviated.

Besides, in the first through fourth embodiments, doors made of an arc-shaped plate having a large radius of curvature close to a flat plate is used as the air mix doors 11 and 12, and the air mix doors 11 and 12 are arranged to be capable of sliding substantially in the vehicle top-and-bottom direction. However, in the fifth embodiment, as the air mix doors 11 and 12, butterfly doors having rotary shafts 11a and 12a extending in the vehicle right-and-left direction and positioned at the intermediate portion in the air flow direction (vehicle front-and-rear portion) are employed instead, and the air mix doors 11 and 12 rotate around the rotary shafts 11a and 12a.

Other Modifications

In the first through fifth embodiments, the air conditioning unit is applied to the semicentral installation layout. However, the present invention can be applied to the air conditioning unit of the complete central installation layout in which the air blower unit is arranged at the vehicle front side of the air conditioning unit.

Moreover, the present invention can be applied not only to an air conditioning unit arranged in an instrument panel at the front in a passenger compartment but also to an air conditioning unit installed in other portions of a vehicle.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. An air conditioner in combination with a vehicle having a windshield and a passenger compartment comprising:
   a case which forms a plurality of air passages in which air flows;
   a cooling heat exchanger arranged in said case for cooling the air;
   a heating heat exchanger arranged in said case at a downstream side relative to said cooling heat exchanger, for heating the air;
   temperature adjusting means for adjusting a temperature of air blown into the passenger compartment by adjusting a ratio of an amount of warmed air heated by said heating heat exchanger to an amount of cooled air cooled by said cooling heat exchanger and bypassing said heating heat exchanger;
   a face opening portion provided at a top area of said case for blowing air with a temperature adjusted by said temperature adjusting means toward a passenger head area;
   a hot air passage provided behind the heating heat exchanger, said hot air passage extending upwardly to the face opening portion;
   a foot opening portion provided at a bottom area of said case, said foot opening portion having an inlet for introducing warmed air from said hot air passage and an outlet for blowing air with a temperature adjusted by said temperature adjusting means toward a passenger foot area;
   a face cool air passage provided above said heating heat exchanger for bypassing said heating heat exchanger and for introducing said cooled air from said cooling heat exchanger to said face opening portion; and
   a foot cool air passage provided at a lateral side of said face cool air passage independently, the foot cool air passage extending downwardly to said inlet of said foot opening portion for bypassing said heating heat exchanger and for introducing said cooled air from said cooling heat exchanger to said inlet of said foot opening portion, and for mixing said cooled air from said foot cool air passage and said warmed air heated by said heating heat exchanger at said inlet of said foot opening portion.

2. The combination according to claim 1, wherein;
   said foot cool air passage has an inlet toward said cooling heat exchanger and a passage extending downwardly along said heating heat exchanger to said inlet of said foot opening portion.

3. The combination according to claim 1, wherein;
   said foot opening portion includes a right-side-foot opening portion and a left-side-foot opening portion; and
   said foot cool air passage includes a right-side-foot cool air passage connected to said right-side-foot opening portion and a left-side-foot cool air passage connected to said left-side-foot opening portion.

4. The combination according to claim 1, wherein:
   a width of said heating heat exchanger is less than a width of said cooling heat exchanger; and
   said foot cool air passage is arranged at said side of said heating heat exchanger and within a range of said width of said cooling heat exchanger.

5. The combination according to claim 4, wherein said width of said heating heat exchanger is in a range between 0.6 times said width of said cooling heat exchanger and 0.8 times said width of said cooling heat exchanger.

6. The combination according to claim 1, wherein said case has an oblong shape such that a width of said case is longer than a length of said case in a vehicle front-and-rear direction and a height of said case in a vehicle top-and-bottom direction.

7. The combination according to claim 1, wherein;
   said air conditioner includes a first foot door for controlling warmed air flow from said heating heat exchanger and a second foot door for controlling cooled air flow from said foot cool air passage; and
   said first foot door and said second foot door are linked together to control the air flow to said foot opening portion.

8. The combination according to claim 7, wherein said first foot door is positioned immediately after said heating heat exchanger in an air flow direction.

9. The combination according to claim 7, wherein said first foot door is positioned at an upstream side of said inlet of said foot opening portion.

10. The combination according to claim 1, wherein said air conditioner further includes opening and closing means for opening and closing a warm air passage.

11. The combination according to claim 1, wherein
    said temperature adjusting means includes an air mix door, and
    said air mix door is disposed at an air upper stream side of said heating heat exchanger.

12. The combination according to claim 1, wherein said inlet of said foot opening portion includes an air mixing chamber communicating with said outlet of said foot opening portion, said air mixing chamber being located below said hot air passage, said air mixing chamber including a hot air inlet communicating said air mixing chamber and said hot air passage and a cool air inlet communicating said air mixing chamber and said foot cool air passage.

13. The combination according to claim 12, wherein:

said outlet of said foot opening portion comprises two outlets located on both lateral sides of said case;

said air mixing chamber comprises two air mixing chambers located next to said outlets;

said foot opening portion further comprises a passage located below said hot air passage, for communicating said hot air passage with said air mixing chambers; and said foot cool air passage comprises two passages located on both sides of said face cool air passage and said hot air passage, for introducing said cooled air into said respective air mixing chambers.

14. The combination according to claim 1, wherein said foot opening portion comprises two foot opening portions located on both lateral sides of said case, and said foot cool air passage comprises two passages located on both sides of said face cool air passage and said hot air passage, for introducing said cooled air into said respective inlets of said foot opening portions.

15. The combination according to claim 1, wherein said cooling heat exchanger is disposed on a relatively front side of said vehicle than said heating heat exchanger in said case, for flowing air generally from front to rear of the vehicle.

16. An air conditioner for a vehicle according to claim 11, wherein said air mix door simultaneously changes opening degrees of both inlets of said face cool air passage and said foot cool air passage.

* * * * *